US007927496B2

(12) United States Patent
Barak

(10) Patent No.: US 7,927,496 B2
(45) Date of Patent: *Apr. 19, 2011

(54) CONTROL OF DEVELOPMENT OF BIOFILMS IN INDUSTRIAL PROCESS WATER

(75) Inventor: Ayala Barak, Tel Aviv (IL)

(73) Assignee: A.Y. Laboratories Ltd., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/607,349

(22) Filed: Oct. 28, 2009

(65) Prior Publication Data

US 2010/0096340 A1 Apr. 22, 2010

Related U.S. Application Data

(63) Continuation of application No. 11/703,070, filed on Feb. 6, 2007, now Pat. No. 7,628,929, which is a continuation of application No. 11/358,578, filed on Feb. 21, 2006, now Pat. No. 7,189,329, which is a continuation of application No. 10/211,965, filed on Aug. 2, 2002, now Pat. No. 7,052,614.

(60) Provisional application No. 60/310,623, filed on Aug. 6, 2001.

(51) Int. Cl.
*C02F 1/76* (2006.01)

(52) U.S. Cl. ............ 210/752; 162/6; 162/161; 210/754; 210/756; 210/764; 422/37; 424/664; 435/184

(58) Field of Classification Search .................... 210/752
See application file for complete search history.

(56) References Cited

U.S. PATENT DOCUMENTS

| 1,378,644 A | 5/1921 | Baker |
| 1,413,153 A | 4/1922 | Baker |
| 1,581,115 A | 4/1926 | Harold |
| 2,112,476 A | 3/1938 | Bowers et al. |
| 2,443,429 A | 6/1948 | Marks et al. |
| 4,297,224 A | 10/1981 | Macchiarolo et al. |
| 4,419,248 A | 12/1983 | Costerton ................. 210/764 |
| 4,476,930 A | 10/1984 | Watanabe |
| 4,929,365 A | 5/1990 | Clark et al. ................. 210/754 |
| 4,966,716 A | 10/1990 | Favstritsky et al. ........... 210/755 |
| 5,395,530 A | 3/1995 | Robertson et al. |
| 5,607,544 A | 3/1997 | Salzburger et al. ............. 162/5 |
| 5,618,385 A * | 4/1997 | Jones et al. ..................... 162/6 |
| 5,670,055 A | 9/1997 | Yu et al. ........................ 210/764 |

(Continued)

FOREIGN PATENT DOCUMENTS

DE 37 41 583 6/1988

(Continued)

OTHER PUBLICATIONS

M. W. LeChevallier, et al., Applied and Environmental Microbiology, pp. 2492-2499, 1998. "Inactivation of Biofilm Bacteria."

(Continued)

*Primary Examiner* — Peter A Hruskoci
(74) *Attorney, Agent, or Firm* — Ladas & Parry LLP

(57) ABSTRACT

There is provided a method of inhibiting the development of a biofilm adjacent a surface, the method comprising intermittently applying a biofilm inhibiting substance to a collection of microorganisms having biofilm developing potential. Other embodiments are also described.

22 Claims, 8 Drawing Sheets

U.S. PATENT DOCUMENTS

| | | | |
|---|---|---|---|
| 5,741,427 A | 4/1998 | Watts et al. | |
| 5,753,180 A | 5/1998 | Burger | 422/7 |
| 5,783,092 A | 7/1998 | Brown et al. | |
| 5,789,239 A | 8/1998 | Eyers et al. | 435/264 |
| 5,827,433 A | 10/1998 | Hegarty et al. | |
| 5,882,526 A | 3/1999 | Brown et al. | 210/753 |
| 5,882,916 A | 3/1999 | Wiersma | 435/261 |
| 5,885,412 A * | 3/1999 | Paart et al. | 162/5 |
| 5,976,386 A | 11/1999 | Barak | 210/756 |
| 6,080,323 A | 6/2000 | Yu et al. | |
| 6,100,080 A | 8/2000 | Johansen | 435/264 |
| 6,106,730 A | 8/2000 | Freymark et al. | 210/754 |
| 6,106,854 A | 8/2000 | Belfer et al. | 424/405 |
| 6,132,628 A | 10/2000 | Barak | 210/756 |
| 6,149,822 A | 11/2000 | Fabri et al. | 210/764 |
| 6,379,563 B1 | 4/2002 | Nalepa | 210/764 |
| 6,419,838 B1 | 7/2002 | Nalepa | 210/758 |
| 6,432,262 B1 * | 8/2002 | Ney et al. | 162/5 |
| 6,562,243 B2 | 5/2003 | Sherman | |
| 7,052,614 B2 * | 5/2006 | Barak | 210/752 |
| 7,067,063 B2 | 6/2006 | Barak | |
| 7,189,329 B2 * | 3/2007 | Barak | 210/752 |
| 7,628,929 B2 * | 12/2009 | Barak | 210/752 |

FOREIGN PATENT DOCUMENTS

| | | |
|---|---|---|
| EP | 0 517 102 | 12/1992 |
| JP | 8-260392 | 10/1996 |
| JP | 10-296268 | 11/1998 |
| JP | 2002-336867 | 11/2002 |
| WO | 98/26807 | 6/1998 |
| WO | WO 98/58075 | 12/1998 |
| WO | WO 99/07826 | 2/1999 |
| WO | WO 99/27786 | 6/1999 |
| WO | WO 00/27438 | 5/2000 |
| WO | WO 00/58532 | 10/2000 |
| WO | WO 01/53216 | 7/2001 |
| WO | WO 02/05637 | 1/2002 |

OTHER PUBLICATIONS

T.S. Rao, et al., "Biocidal Efficacy of Monochloramine Against Biofilm Bacteria", Biofouling 12(4), pp. 321-332, 1998.
G. A. Smook, Handbook of Pulp and Paper Terminology, Cegep de Trois-Rivieres, 1990.
David G. Davies & A.W. Decho, in "Microbial Extracellular Polymeric Substances", Springer-Verlag 1999; Chapters 5 & 9 pp. 218-219 & 155-165.
K. Jokinen, "Papermaking Chemistry", Part 4, 1999, Ed. Fapet Oy. pp. 257-260.
J.F. Kramer, MP Chemical Treatment, Aug. 1997, pp. 42-50, "Peracetic Acids A New Biocide for Industrial Water Applications." Patent abstracts of Japan, vol. 1995 No. 6, Jul. 1995, & JP 07 061903.
The Handbook of Photometrical Operation Analysis, by Dr. Lange for LASA 20, Oct. 1997.
Christopher K. Davies, et al., "Novel Biocide Provides Microbiological Control without Adversly Effecting the Papermaking Process", TAPPI Paper Summit Proceedings, Mar. 4-6, 2002, Atlanta.
J.F. Kramer, "Biofilm Control with Bromo-Chloro-Dimethyl-Hydantoin", Oct. 2000.
Harold, H. H. "Chloramine Treatment of Water in the Field" *J. Royal Army Med. Corps* (1926) vol. 46, No. 115, pp. 115-119.
Holwerda, K. "On the Control and the Degree of Reliability of the Chlorination-Process of Drinking-Water, in Connection with the Chloramin-Procedure and the Chlorination of Ammoniacal Water, (first part)" *From the Laboratory of Purification of Water at Manggarai* (1928) pp. 251-297.
Chapin, R. M. "Dichloro-Amine" *J. Am. Chem. Soc.* (1929) vol. 51, pp. 2112-2117.
Rideal, S. "The Influence of Ammonia and Organic Nitrogenous Compounds on Chlorine Disinfection" *Journal of The Royal Sanitary Institute* (1910) vol. XXXI, No. 2, pp. 33-45.
Race, J. "Chlorination of Water" *John Wiley & Sons, Inc.* (1918) Chapter 1, pp. 1-13, Chapter 11, pp. 14-29, and Chapter IX, pp. 115-131.
Schirtzinger, M.M. "Chlorine Compounds for Microbiological Control" *Paper Mill News* (1963) pp. 18, 22-25.
Block, S.S. "Disinfection, Sterilization, and Preservation" *Lippincott Williams & Wilkins* (2001) pp. 139-147.
Enslow, L. H. "Ammonia-Chlorine Reactions and Chloramine Production" *Contact Record and Engineering Review* (1931) vol. 95, No. 10, pp. 291-295.
Haas, C. "Disinfection" in Pontius, Frederick W., Editor, "Water Quality & Treatment" *McGraw-Hill* (1990) Fourth Edition, pp. 877-595.
McAmis, J.W. "Prevention of Phenol Taste with Ammonia" *J. AMMA* 17(3):314 (1927) pp. 341-350.
Wolfe, R. L. et al. "Inorganic Chloramines as Drinking Water Disinfectants: A Review" *Journal AWWA* (1984) pp. 74-88.
Johnson J. D. et al. "Bromine and Bromamine Disinfection Chemistry" in *Journal of the Sanitary Engineering Division—Proceedings of the American Society of Civil Engineers* (1971) pp. 617-631.
Phillips, H. "White Water Utilzation" *The Paper Mill* (1933) pp. 131-134.
Martin, R.B. et al. "Microbiological Control in Pulp and Paper Manufacture" *Technical Association Paper* (1940) Series XXIII, No. 1, pp. 239-245.
Trautschold, R. "Slime: Its Control in Paper Making by Chlorine and Ammonia" *Chemical Industries* (1936) Series XXXIX, No. 1, pp. 27-29.
"Chloramine at Denver Solves Aftergrowth Problem" *Engineering News-Record* (1916) vol. 79, No. 5, p. 210.
Olszewski, W. "The New Ammonia/Chlorine Gas Disinfecting Process" *Chemiker Zeitung* (1927, No. 28, p. 1-3.
Olsqewski, W. "The Monochloramine Process for Disinfecting Swimming Pool Water" *Chemiker Zeitung* (1928) No. 14, p. 1-3.
Houghton C. U. "The Bromide Content of Underground Waters. Part II. Observations on the Chlorination of Water Containing Free Ammonia and Naturally Occurring Bromide" (1946) pp. 324-328.
An Office Action dated Dec. 9, 2008, which issued during the prosecution of Applicant's Japanese Patent Application No. 2003-518988.
An Office Action dated Oct. 26, 2010, which issued during the prosecution of Applicant's Brazilian Patent Application No. 0211551-4.

* cited by examiner

HW DIFFERENCE: FUZZ.-CONTROL

HW-DIFFERENCE DECAY CURVES

HOLES AND SPOTS IN PAPER - BIOFILM REMOVAL

INITIAL FOULING REMOVAL

CONTROL OF DEVELOPMENT OF BIOFILMS IN INDUSTRIAL PROCESS WATER

This application is a continuation of application Ser. No. 11/703,070 filed on Feb. 6, 2007 (now U.S. Pat. No. 7,628,929 issued Dec. 8, 2009), which is a continuation of application Ser. No. 11/358,578 filed on Feb. 21, 2006, (now U.S. Pat. No. 7,189,329 issued Mar. 13, 2007) which is a continuation of application Ser. No. 10/211,965 filed on Aug. 2, 2002 (now U.S. Pat. No. 7,052,614 issued May 30, 2006) which claims the benefit of U.S. Provisional Application No. 60/310,623 filed Aug. 6, 2001 and incorporates the same by reference.

CROSS-REFERENCE TO RELATED APPLICATIONS

This application is a continuation of U.S. patent application Ser. No. 10/211,965, filed Aug. 2, 2002, which claims the benefit of U.S. Provisional Patent Application No. 60/310,623, filed Aug. 6, 2001.

FIELD OF THE INVENTION

The present invention relates to the control of development of biofilms in industrial process water and water supply lines.

BACKGROUND

Industrial water-carrying vessels, such as process chests, pipes, process water storage tanks, additive tanks, filters, water supply pipes or waste-water pipes, etc., are often observed to have a growth coating one or more surfaces of the water-carrying vessel where the surfaces contact the water. This growth is actually a biofilm, a collection of microorganisms embedded in a matrix of extracellular polymeric substances and various organic and inorganic compounds. In the last several years, the nature of these biofilms has been the focus of attention among both academic and industrial researchers.

Although biofilms may contain a single species of microorganism, typically biofilms comprise not only different species of microorganisms but different types of microorganisms, for example algae, protozoa, bacteria and others. It has been found that one of the characterizing features of biofilms is that the microorganisms therein act cooperatively or synergistically. Thus, for example, the activity of certain enzymes produced by bacteria which are attached to a surface is observed to be much higher than the corresponding activity of the same enzymes produced by these bacteria in planktonic form, i.e. when free-floating (David G. Davies, in "Microbial Extracellular Polymeric Substances", Springer-Verlag 1999; Editors: J. Wingender, T. R. New, H. C. Flemming, hereinafter "Wingender et al."). Comparative studies of enzyme activities in planktonic bacteria and bacteria attached to solid surfaces which contact water have shown that enzymatic activity in attached bacteria is greater than in planktonic bacteria (M. Hoffman and Alan W. Decho in Wingender et al.). Communication within microbial biofilms is responsible for the induction and regulation of the activities of the biofilm, including for example extracellular enzyme biosynthesis, biofilm development, antibiotic biosynthesis, biosurfactant production, exo-polysaccharide synthesis and more, all of which involve complex biochemical activity (Alan W. Decho in Wingender et al.). Exchange of genetic material between the microorganisms in biofilms has also been observed.

Empirically it has been found that, in a given industrial water environment, microorganisms living in a biofilm are better protected from biocides than microorganisms living outside a biofilm. Thus, collectively the microorganisms embedded in a biofilm display characteristics which are different from the characteristics which are displayed by a like number of planktonic microorganisms.

By acting cooperatively, a collection of microorganisms acts as a microbial community: it is able to construct a matrix formed of inorganic and organic material and thus to form and maintain a biofilm. Since microorganisms are single-celled organisms that grow and multiply, the microorganisms in a biofilm must continually replenish the matrix around them, expand the matrix and maintain the matrix. This process can be likened to a group of people who act together to construct a contiguous set of dwelling units for themselves, and who then not only maintain the existing homes but also add additional homes to accommodate population growth, either by building contiguously horizontally or by adding new homes vertically on top of existing homes.

As scientists best understand it at present, the cooperative behavior between the microorganisms in biofilms is induced by communication between the microorganisms. For example, homoserine lactones play an important role in communication between bacteria. The extracellular polymer matrix of a biofilm seems to present an efficient medium for chemical communication and thus to promote more efficient communication between individual microorgansims embedded in the biofilm.

Because microorganisms in biofilms are more effective than planktonic microorganisms in producing enzymes, much interest has been shown in developing biofilms for effecting chemical reactions. However, in the context of industrial and process water-carrying vessels, such as conduits, water tanks and the like, this propensity to produce enzymes, and more importantly the tendency of biofilms to form heavy biomass on the surface of the vessel, can be extremely detrimental. As a biofilm grows, it may reduce the effective diameter of a pipe or other conduit at a particular point along the path of the water or increase friction along the flow path in the conduit, thus increasing resistance to the flow of water through the conduit, reducing the flow of water therethrough, increasing power consumption in the pumps which push or pull the water through the conduit, and decreasing the efficiency of industrial operations.

Biofilms also deteriorate the quality of various chemicals and process additives. For example, in the paper industry, biofilms cause deterioration of chemicals like starch and calcium carbonate slurries which are added to the pulp slurries in the wet end processes (K. Jokinen in "Papermaking Chemistry", Part 4, 1999, Ed. Fapet Oy). Microorganisms are also responsible for hydrogen peroxide degradation in bleaching and de-inking systems (J. F. Kramer, MP Chemical Treatment, August 1997, pp. 42-50). The presence of $H_2O_2$-degrading enzymes in de-inking and bleaching mills thus necessitates the feeding of larger quantities of hydrogen peroxide than would otherwise be necessary in order to meet the set point bleaching criteria, thereby increasing production costs.

Biofilms may also cause severe corrosion of pipes and chests, may cause severe problems in paper and board machines, and inter alia may cause deterioration of the quality of finished paper, foul odors and severe runnability problems.

Various methods have been described in the prior art in order to control biofilms in industry. One approach has been to physically destroy the biofilm by mechanical means, e.g. by scraping or by sonication. For example, U.S. Pat. No. 4,419,248 to Costerson describes a method for removing biofilm from a surface submerged in water. The method includes cooling the surface to below the freezing point of water to thereby generate large, sharp-edged ice crystals in the biofilm. The frozen biofilm is then thawed and removed from the surface by, for instance, flowing a liquid across the surface. This approach is often impractical, however, since the place where the biofilm grows may be inaccessible, and/or disruption of industrial operations may be required in order to reach the biofilm.

Another approach has been to physically destroy the biofilm by chemical means, e.g. by use of surface-active agents and detergents which cause the biofilm matrix to break apart. For example, U.S. Pat. No. 5,753,180 to Burger describes a non-biocidal method for inhibiting microbially influenced corrosion susceptible metal surfaces having an anaerobic biofilm containing active sulfate-reducing bacteria, comprising contacting the biofilm with a liquid dispersion of an anthraquinone compound. U.S. Pat. No. 6,149,822 to Fabri describes a process for both removing and controlling biofilms present in industrial cooling and process waters. The process provides a composition which includes the reaction products of an amino base, formaldehyde, an alkylenepolyamine, and the ammonium salt of an inorganic or organic acid. The composition may be used to remove existing biofilms from process water equipment. Further lower maintenance dosages may be used to maintain the equipment in a substantially biofilm free condition. U.S. Pat. No. 5,670,055 to Yu et al. describes a method for dispersing biofilms in industrial process water, which comprises adding an effective biofilm dispersing amount of linear alkylbenzene sulfonate to industrial process water which contains slime-forming bacteria and other microorganisms. An alternative embodiment of the invention of Yu et al. comprises adding a compound selected from the group of biocides cited therein, combined with a biofilm dispersing agent from a list cited therein as well. U.S. Pat. No. 5,382,916 to Wiersma describes a decontamination process for reducing the surface tension of a biofilm, allowing for the removal of biofilm and the control of underlying bacteria. In accordance with the invention of Wiersma, a solution consisting of saponin and soft acid such as food grade sodium lactate is contacted with the biofilm. The saponin acts as a foaming agent, providing surface tension reduction capable of loosening the biofilm.

Approaches are known in the art in which the biofilm matrix is degraded by enzymes which are fed externally. For example, U.S. Pat. No. 6,100,080 to Johansen describes a method for cleaning and disinfecting a surface at least partly covered by a biofilm layer, comprising the steps of contacting the biofilm with a cleaning composition comprising one or more hydrolases, for either fully or partly removing or releasing the biofilm layer from the surface; and contacting the biofilm with a bactericidal disinfecting composition which comprises an oxidoreductase in an amount effective for killing the living bacterial cells present in the biofilm. Attack with external enzymes leads to loss of activity and changes in the properties of the biofilm. Such approaches preclude the ability of the microorganisms to maintain or expand the matrix. However, such approaches suffer from various drawbacks, for example the treatment may be too specific and results may vary in different sites, or the treatment may not be cost-effective.

An additional difficulty encountered in controlling biofilms in accordance with the prior art is that as the biofilm matrix decomposes, viable cells are usually released into the water. Such viable cells may start a new biofilm. Similarly, decomposition of the biofilm matrix may lead to release of enzymes into the water, which may affect the industrial processes being carried out.

In this regard, biocides can be useful. The use of biocides to treat planktonic bacteria in industrial process waters is known in the art. See, for example, the inventor's own U.S. Pat. Nos. 5,976,386 and 6,132,628, the contents of which are incorporated herein by reference, or U.S. Pat. No. 5,882,526 to Brown et al., which describes a method for treating regulated waters using a combination of a halogen-containing oxidizer, an erosion control agent, hydrogen peroxide, and a hydrogen peroxide stabilizer. More recently, biocides have been used in attempts to control biofilms. This goal has sometimes been achieved by combining a biofilm-degrading technique, such as feeding of biofilm-degrading enzymes or physical removal of biofilms, with the application of a biocide which enables the maintenance of a low count of planktonic microorganisms in the process water. For example, U.S. Pat. No. 5,789,239 to Eyers et. al. describes the use of (a) at least one enzyme from a defined group to degrade the biofilm and (b) a short-chain glycol as a biocide for the avoidance and/or removal of biofilm on surfaces. U.S. Pat. No. 4,966,716 to Favstritsky et al. describes a method for controlling the growth of microorganisms which reduce the efficiency of recirculating water systems comprising introducing into such systems a biocidally effective amount of a water soluble perhalide. The perhalide is first introduced in amounts sufficient to kill the microorganisms at film forming surfaces of the system. Thereafter, the concentration of organic ammonium perhalide is maintained at a level sufficient to reduce substantially the regrowth of such microorganisms.

Alternatively, biocides have been used to control microorganisms embedded in biofilms, i.e. to eradicate the microorganisms themselves within the biofilm matrix. Specifically, monochloroamines (MCAs) and free chlorine (FC) were claimed to show similar efficacy in disinfecting biofilm bacteria (M. W. LeChevallier et al., Applied and Environmental Microbiology, pp. 2492-2499, 1988; T. S. Rao et al., Biofouling 12(4) pp. 321-332, 1998). The difficulty with this approach, as stated above, is that empirically it has been found that eradicating microorganisms in biofilms requires concentrations of biocides which are several times higher than the concentrations of biocides required to eradicate planktonic microorganisms, that long contact times between the biofilm microorganisms and the biocide are required, or that continuous application of the biocides is required. This increases the cost of treatment, and may expose workers to greater risks from the biocides than is desirable or allowable. It also poses a greater risk to the environment.

Approaches to biofilm control utilizing combinations of the above methods are also known in the art. These combination approaches, which are designed in an attempt to solve problems which emerge during the implementation of each approach separately, may also suffer from some of the drawbacks described above. For example, U.S. Pat. No. 6,106,854 to Belfer describes an aseptic disinfectant composition in liquid form having germicidal and biofilm cleaning properties comprising an anti-infective, an antiseptic agent, and an anti-biofilm agent for killing organisms, a water purifying agent for acting as a detergent, a sanitizer and a bactericide, a cleansing agent for acting as an astringent and an abradant in the removal of biofilm from contaminated surfaces and as a bactericide and fungicide, an anti-oxidant and stabilizer agent, a scrubbing agent for acting as an abrasive and a cleanser for the removal of biofilm from contaminated surfaces, at least one pH adjuster for acidifying the disinfectant composition, and a diluent in the range of 35.0% to 50:0% by weight of the disinfectant composition. Barbeau et al., in PCT Patent Publication No. WO 00/27438, describe a composition for removing biofilm. This composition minimally comprises a detergent, a salt or a salt forming acid, and a bactericide.

A method and composition for suppressing or inhibiting the decomposition action of enzymes on hydrogen peroxide during bleaching of cellulose fibers with hydrogen peroxide in a way that microorganisms are not markedly affected is described in U.S. Pat. No. 5,885,412 to Paart et al. The composition contains hydroxylamine, thiocyanate salts, formic acid, ascorbic acid, or nitrites. It is suggested that the use of one or more of these substances suppresses or inhibits enzymes such as peroxidases and catalases from decomposing hydrogen peroxide, but does not affect microorganisms.

A more recent method for preventing biofilm growth has been to interfere with and prevent the chemical communication between cells in the biofilm, for example by utilizing antagonists of homoserine lactones. As in the Biblical story of the Tower of Babel, such approaches directly disrupt communication between the microorganisms contained in the biofilm, thus impeding the microorganisms' ability to coordinate their actions in order to replenish, expand and maintain the matrix, and ultimately leading to decomposition of the matrix. For example, Rycroft et al. in PCT Patent Publication no. WO 99/27786 describe compounds which may be used in the treatment or prevention of a bacterial infection in humans or in animals by controlling colonization of bacteria. The compounds may be employed to remove biofilms from surfaces. Davies et al. in PCT Patent Publication No. WO 98/58075 describe a method to control the formation, persistence and dispersion of microbial biofilms by taking advantage of the natural process of cell-cell communication in bacteria. As with treatment by extracellular enzymes, treatment of biofilms in industrial water using antagonists of homoserine lactones may be too specific, may yield varying results in different sites, or may not be cost-effective.

The present invention seeks to provide a method for controlling the development of biofilms. The present invention is based on the surprising observation that the biocides of the inventor's own U.S. Pat. Nos. 5,976,386 and 6,132,628, the contents of both of which are incorporated herein by reference, unexpectedly control biofilm development, at a feed rate and according to a feeding regime which are insufficient to cause significant killing of microorganisms embedded in the biofilms. The unexpectedly low feed rate and feed regime may be used to maintain biofilm-free surfaces, to remove existing biofilms and to limit the production of enzymes, including peroxide degrading enzymes such as catalases, peroxidases and dehydrogenases and starch-degrading enzymes such as amylases, which may otherwise be formed by the microorganisms embedded in biofilms. Furthermore, the present invention enables industrial operations involving process waters, such as paper bleaching or de-inking plants, to operate more efficiently, for example by reducing the amount of peroxide required during bleaching or de-inking, by reducing the frequency of boil-out, i.e. cleaning the papermaking machinery with hot, caustic water, and by reducing downtime due to boil-out and other cleaning operations. The present invention also enables optimization of industrial processes which utilize water, including the wet-end chemistry of industrial paper-making processes, by controlling the development of biofilms on the surfaces of fibers, suspended particles and additives. It has been recognized by the present inventor that the growth of biofilms on the surface of fibers and suspended particles can interfere with the binding of such fibers or particles, resulting in defects or reduced quality in the resulting paper.

SUMMARY OF THE INVENTION

There is thus provided in accordance with a preferred embodiment of the invention a method of inhibiting the development of a biofilm adjacent a surface, the method comprising intermittently applying a biofilm inhibiting substance to a collection of microorganisms having biofilm developing potential.

In a preferred embodiment of the invention, said intermittently applying includes intermittently administering the biofilm inhibiting substance to water communicating with the collection of microorganisms.

In a preferred embodiment of the invention, said intermittently applying comprises: administering a first discrete amount of a biofilm inhibiting substance to water communicating with the collection of microorganisms; waiting for a specified period of time; and thereafter, administering a second discrete amount of a biofilm inhibiting substance to water communicating with the collection of microorganisms.

In a preferred embodiment of the invention, said intermittently applying comprises administering a first discrete amount of a biofilm inhibiting substance to water communicating with the collection of microorganisms, whereby to obtain a first concentration of the biofilm inhibiting substance in the water communicating with the collection of microorganisms allowing the concentration of the biofilm inhibiting substance in the water communicating with the collection of microorganisms to fall below said first concentration; and thereafter, administering a second discrete amount of a biofilm inhibiting substance to water communicating with the collection of microorganisms.

In one preferred embodiment of the invention, the biofilm inhibiting substance is applied to the collection of microorganisms periodically with a duty cycle of less than 1:2. In another preferred embodiment of the invention, the biofilm inhibiting substance is applied to the collection of microorganisms periodically with a duty cycle of between about 1:5 and 1:10. In another preferred embodiment of the invention, the biofilm inhibiting substance is applied to the collection of microorganisms periodically with a duty cycle of less than 1:10. In another preferred embodiment of the invention, the biofilm inhibiting substance is applied to the collection of microorganisms periodically with a duty cycle of less than 1:25. In a preferred embodiment of the invention, the biofilm inhibiting substance is applied to the collection of microorganisms periodically with a duty cycle of less than 1:50.

In a preferred embodiment of the invention, said intermittently applying comprises intermittently administering the biofilm inhibiting substance for a period of between about 5 minutes and about 4 hours at each intermittent application.

In one preferred embodiment of the invention, the collection of microorganisms is attached to a durable surface. In another preferred embodiment of the invention, the collection of microorganisms is attached to a consumable surface.

In one preferred embodiment of the invention, the collection of microorganisms is attached to a durable surface and each intermittent application of the biofilm inhibiting substance is for a period of about 3 hours. In another preferred embodiment of the invention, collection of microorganisms is attached to a consumable surface and each intermittent application of the biofilm inhibiting substance is for a period of about 5 minutes.

In one preferred embodiment of the invention, the biofilm the development of which is inhibited is adjacent a durable surface. In another preferred embodiment of the invention, the biofilm the development of which is inhibited is adjacent a consumable surface.

In a preferred embodiment of the invention, the collection of microorganisms is located at an interface between water and a surface of a solid in an industrial water environment.

In a preferred embodiment of the invention, said intermittently applying a biofilm inhibiting substance includes intermittently generating the biofilm inhibiting substance in real time. In a preferred embodiment of the invention, said intermittently applying further includes supplying the biofilm inhibiting substance to the collection of microorganisms as the biofilm inhibiting substance is generated in real time.

In a preferred embodiment of the intention, said intermittently generating the biofilm inhibiting substance in real time includes producing a predetermined dilution of a hypochlorite oxidant, producing a predetermined dilution of an ammonium salt, synchronously metering the two dilutions into a mixer to continuously mix therein according to a predetermined ratio to produce the biofilm inhibiting substance having an effective amount of reproducibility, stability and efficacy in situ in the mixer.

In a preferred embodiment of the invention, said intermittently generating the biofilm inhibiting substance in real time includes producing a predetermined dilution of a hypochlorite oxidant, producing a predetermined dilution of an ammonium salt, synchronously metering the two dilutions into a mixer to continuously mix therein according to a predetermined ratio to produce the biofilm inhibiting substance having an effective amount of reproducibility, stability and efficacy in situ in the mixer, and said supplying the biofilm inhibiting substance to the collection of microorganisms as the biofilm inhibiting substance is generated in real time comprises continuously injecting the active biofilm inhibiting substance, as it is produced in situ in the mixer, from the mixer into water communicating with the collection of microorganisms.

In a preferred embodiment of the invention, said intermittently generating the biofilm inhibiting substance includes continuously and synchronously injecting a quantity of hypochlorite into a first stream of water passing through a first conduit to produce therein a predetermined dilution of the hypochlorite, continuously and synchronously injecting a quantity of an ammonium salt into a second stream of water passing through a second conduit to produce therein a predetermined dilution of the ammonium salt and continuously and synchronously injecting the first and second streams into a mixer according to a predetermined ratio to produce the biofilm inhibiting substance in situ in the mixer.

In a preferred embodiment of the invention, said intermittently generating the biofilm inhibiting substance includes continuously and synchronously injecting a quantity of hypochlorite into a first stream of water passing through a first conduit to produce therein a predetermined dilution of the hypochlorite, continuously and synchronously injecting a quantity of an ammonium salt into a second stream of water passing through a second conduit to produce therein a predetermined dilution of the ammonium salt and continuously and synchronously injecting the first and second streams into a mixer according to a predetermined ratio to produce the biofilm inhibiting substance in situ in the mixer, and said supplying the biofilm inhibiting substance to the collection of microorganisms as the biofilm inhibiting substance is generated in real time comprises continuously injecting the biofilm inhibiting substance, as it is produced in situ in the mixer from the mixer into water communicating with the collection of microorganisms.

In a preferred embodiment of the invention, the ammonium salt is selected from the group consisting of ammonium bromide and ammonium chloride.

In a preferred embodiment of the invention, the biofilm inhibiting substance includes an effective amount of bromide activated chloramine.

There is also provided, in accordance with a preferred embodiment of the invention, a method of inhibiting the development of a biofilm adjacent a surface, the method comprising inhibiting the biofilm developing potential of a collection of microorganisms without completely eradicating the collection of microorganisms.

In a preferred embodiment of the invention, said inhibiting the biofilm developing potential of a collection of microorganisms without completely eradicating the collection of microorganisms comprises intermittently applying a biofilm inhibiting substance to a collection of microorganisms having biofilm developing potential.

In a preferred embodiment of the invention, said intermittently applying includes intermittently administering the biofilm inhibiting substance to water communicating with the collection of microorganisms.

In a preferred embodiment of the invention, said intermittently applying comprises: administering a first discrete amount of a biofilm inhibiting substance to water communicating with the collection of microorganisms; waiting for a specified period of time; and thereafter, administering a second discrete amount of a biofilm inhibiting substance to water communicating with the collection of microorganisms.

In a preferred embodiment of the invention, said intermittently applying comprises administering a first discrete amount of a biofilm inhibiting substance to water communicating with the collection of microorganisms, whereby to obtain a first concentration of the biofilm inhibiting substance in the water communicating with the collection of microorganisms, allowing the concentration of the biofilm inhibiting substance in the water communicating with the collection of microorganisms to fall below said first concentration; and thereafter, administering a second discrete amount of a biofilm inhibiting substance to water communicating with the collection of microorganisms.

In one preferred embodiment of the invention, the biofilm inhibiting substance is applied to the collection of microorganisms periodically with a duty cycle of less than 1:2. In another preferred embodiment of the invention, the biofilm inhibiting substance is applied to the collection of microorganisms periodically with a duty cycle of between about 1:5 and 1:10. In another preferred embodiment of the invention, the biofilm inhibiting substance is applied to the collection of microorganisms periodically with a duty cycle of less than 1:10. In another preferred embodiment of the invention, the biofilm inhibiting substance is applied to the collection of microorganisms periodically with a duty cycle of less than 1:25. In another preferred embodiment of the invention, the biofilm inhibiting substance is applied to the collection of microorganisms periodically with a duty cycle of less than 1:50.

In a preferred embodiment of the invention, said intermittently applying comprises intermittently administering the biofilm inhibiting substance for a period of between about 5 minutes and about 4 hours at each intermittent application.

In one preferred embodiment of the invention, the collection of microorganisms is attached to a durable surface. In another preferred embodiment of the invention, the collection of microorganisms is attached to a consumable surface.

In one preferred embodiment of the invention, the collection of microorganisms is attached to a durable surface and each intermittent application of the biofilm inhibiting substance is for a period of about 3 hours. In another preferred embodiment of the invention, the collection of microorganisms is attached to a consumable surface and each intermittent application of the biofilm inhibiting substance is for a period of about 5 minutes.

In a preferred embodiment of the invention, the biofilm the development of which is inhibited is adjacent a durable surface. In another preferred embodiment of the invention, the biofilm the development of which is inhibited is adjacent a consumable surface.

In a preferred embodiment of the invention, collection of microorganisms is located at an interface between water and a surface of a solid in an industrial water environment.

In one preferred embodiment of the invention, said intermittently applying a biofilm inhibiting substance includes intermittently generating the biofilm inhibiting substance in real time. In another preferred embodiment of the invention, said intermittently applying further includes supplying the biofilm inhibiting substance to the collection of microorganisms as the biofilm inhibiting substance is generated in real time.

In a preferred embodiment of the invention, said intermittently generating the biofilm inhibiting substance in real time includes producing a predetermined dilution of a hypochlorite oxidant, producing a predetermined dilution of an ammonium salt, synchronously metering the two dilutions into a mixer to continuously mix therein according to a predetermined ratio to produce the biofilm inhibiting substance having an effective amount of reproducibility, stability and efficacy in situ in the mixer.

In a preferred embodiment of the invention, said intermittently generating the biofilm inhibiting substance in real time includes producing a predetermined dilution of a hypochlorite oxidant, producing a predetermined dilution of an ammonium salt, synchronously metering the two dilutions into a mixer to continuously mix therein according to a predetermined ratio to produce the biofilm inhibiting substance having an effective amount of reproducibility, stability and efficacy in situ in the mixer, and said supplying the biofilm inhibiting substance to the collection of microorganisms as the biofilm inhibiting substance is generated in real time comprises continuously injecting the active biofilm inhibiting substance, as it is produced in situ in the mixer, directly from the mixer into water communicating with the collection of microorganisms.

In a preferred embodiment of the invention, said intermittently generating the biofilm inhibiting substance includes continuously and synchronously injecting a quantity of hypochlorite into a first stream of water passing through a first conduit to produce therein a predetermined dilution of the hypochlorite, continuously and synchronously injecting a quantity of an ammonium salt into a second stream of water passing through a second conduit to produce therein a predetermined dilution of the ammonium salt and continuously and synchronously injecting the first and second streams into a mixer according to a predetermined ratio to produce the biofilm inhibiting substance in situ in the mixer.

In a preferred embodiment of the invention, said intermittently generating the biofilm inhibiting substance includes continuously and synchronously injecting a quantity of hypochlorite into a first stream of water passing through a first conduit to produce therein a predetermined dilution of the hypochlorite, continuously and synchronously injecting a quantity of an ammonium salt into a second stream of water passing through a second conduit to produce therein a predetermined dilution of the ammonium salt and continuously and synchronously injecting the first and second streams into a mixer according to a predetermined ratio to produce the biofilm inhibiting substance in situ in the mixer, and said supplying the biofilm inhibiting substance to the collection of microorganisms as the biofilm inhibiting substance is generated in real time comprises continuously injecting the biofilm inhibiting substance, as it is produced in situ in the mixer directly from the mixer into water communicating with the collection of microorganisms.

In a preferred embodiment of the invention, the ammonium salt is selected from the group consisting of ammonium bromide and ammonium chloride.

In a preferred embodiment of the invention, the biofilm inhibiting substance includes an effective amount of bromide activated chloramine.

There is also provided, in accordance with a preferred embodiment of the invention, a method of inhibiting the development of a biofilm adjacent a surface, the method comprising inhibiting the biofilm developing potential of a collection of microorganisms without completely eradicating the collection of microorganisms by intermittently applying a biofilm inhibiting substance to a collection of microorganisms having biofilm developing potential.

There is also provided, in accordance with a preferred embodiment of the invention, a system for inhibiting the development of a biofilm adjacent a surface, the system comprising an intermittent applicator for intermittently applying a biofilm inhibiting substance to a collection of microorganisms having biofilm developing potential.

In a preferred embodiment of the invention, the intermittent applicator includes an administerer which administers the biofilm inhibiting substance to water communicating with the collection of microorganisms.

In a preferred embodiment of the invention, the administerer administers a first discrete amount of a biofilm inhibiting substance to water communicating with the collection of microorganisms, and, after a specified period of time, administers a second discrete amount of a biofilm inhibiting substance to water communicating with the collection of in microorganisms.

In a preferred embodiment of the invention, the administerer administers a first discrete amount of a biofilm inhibiting substance to water communicating with the collection of microorganisms, whereby to obtain a first concentration of the biofilm inhibiting substance in the water communicating with the collection of microorganisms; and, after allowing the concentration of the biofilm inhibiting substance in the water communicating with the collection of microorganisms to fall below said first concentration, administers a second discrete amount of a biofilm inhibiting substance to water communicating with the collection of microorganisms.

In one preferred embodiment of the invention, the biofilm inhibiting substance is applied to the collection of microorganisms periodically with a duty cycle of less than 1:2. In another preferred embodiment of the invention, the intermittent applicator applies the biofilm inhibiting substance to the collection of microorganisms periodically with a duty cycle of between about 1:5 and 1:10. In another preferred embodiment of the invention, the intermittent applicator applies the biofilm inhibiting substance is the collection of microorganisms periodically with a duty cycle of less than 1:10. In another preferred embodiment of the invention, the intermittent applicator applies the biofilm inhibiting substance to the collection of microorganisms periodically with a duty cycle of less than 1:25. In another preferred embodiment of the invention, the intermittent applicator applies the biofilm inhibiting substance to the collection of microorganisms periodically with a duty cycle of less than 1:50.

In a preferred embodiment of the invention, the administerer administers the biofilm inhibiting substance for a period of between about 5 minutes and about 4 hours at each intermittent application.

In one preferred embodiment of the invention, the collection of microorganisms is attached to a durable surface. In another preferred embodiment of the invention, the collection of microorganisms is attached to a consumable surface.

In one preferred embodiment of the invention, the collection of microorganisms is attached to a durable surface and each intermittent application of the biofilm inhibiting substance is for a period of about 3 hours. In another preferred embodiment of the invention, the collection of microorganisms is attached to a consumable surface and each intermittent application of the biofilm inhibiting substance is for a period of about 5 minutes.

In one preferred embodiment of the invention, the biofilm the development of which is inhibited is adjacent a durable surface. In another preferred embodiment of the invention, the biofilm the development of which is inhibited is adjacent a consumable surface.

In a preferred embodiment of the invention, the collection of microorganisms is located at an interface between water and a surface of a solid in an industrial water environment.

In a preferred embodiment of the invention, the intermittent applicator intermittently generates the biofilm inhibiting substance in real time.

In a preferred embodiment of the invention, the intermittent applicator further supplies the biofilm inhibiting substance to the collection of microorganisms as the biofilm inhibiting substance is generated in real time.

In a preferred embodiment of the invention, the intermittent applicator further comprises a first producer for producing a predetermined dilution of a hypochlorite oxidant, a second producer for producing a predetermined dilution of an ammonium salt, and a controller for synchronously metering the two dilutions into a mixer to continuously mix therein according to a predetermined ratio to produce the biofilm inhibiting substance having an effective amount of reproducibility, stability and efficacy in situ in the conduit.

In a preferred embodiment of the invention, the applicator further comprises an injector for injecting the active biofilm inhibiting substance, as it is produced in situ in the mixer, directly from the mixer into water communicating with the collection of microorganisms.

In a preferred embodiment of the invention, in each intermittent generation of the biofilm inhibiting substance the system continuously and synchronously injects a quantity of hypochlorite into a first stream of water passing through a first conduit to produce therein a predetermined dilution of the hypochlorite, continuously and synchronously injects a quantity of an ammonium salt into a second stream of water passing through a second conduit to produce therein a predetermined dilution of the ammonium salt and continuously and synchronously injects the first and second streams into a mixer according to a predetermined ratio to produce the biofilm inhibiting substance in situ in the mixer.

In a preferred embodiment of the invention, in each intermittent generation of the biofilm inhibiting substance the system continuously and synchronously injects a quantity of hypochlorite into a first stream of water passing through a first conduit to produce therein a predetermined dilution of the hypochlorite, continuously and synchronously injects a quantity of an ammonium salt into a second stream of water passing through a second conduit to produce therein a predetermined dilution of the ammonium salt and continuously and synchronously injects the first and second streams into a mixer according to predetermined ratio to produce the biofilm inhibiting substance in situ in the mixer, and in each intermittent application the applicator continuously injects the biofilm inhibiting substance, as it is produced in situ in the mixer directly from the mixer into water communicating with the collection of microorganisms.

In a preferred embodiment of the invention, the ammonium salt is selected from the group consisting of ammonium bromide and ammonium chloride.

In a preferred embodiment of the invention, the biofilm inhibiting substance includes an effective amount of bromide activated chloramine.

There is also provided, in accordance with a preferred embodiment of the invention, a method for inhibiting the development of a biofilm comprising applying to a collection of microorganisms attached to a surface in an industrial water environment at an interface between the surface and water an amount of bromide activated chloramine effective to inhibit the development of a biofilm by the collection of microorganisms without completely eradicating the collection of microorganisms.

There is also provided, in accordance with a preferred embodiment of the invention, a method of inhibiting the development of a biofilm adjacent a surface, the method comprising intermittently applying bromide activated chloramine to a collection of microorganisms having biofilm developing potential.

In a preferred embodiment of the invention, each intermittent application of the bromide activated chloramine includes producing a predetermined dilution of a hypochlorite oxidant, producing a predetermined dilution of ammonium bromide, synchronously metering the two dilutions into a mixer to continuously mix therein according to a predetermined ratio to produce the bromide activated chloramine having an effective amount of reproducibility, stability and efficacy in situ in the mixer and continuously injecting the bromide activated chloramine, as it is produced in situ in the mixer, directly from the mixer into water communicating with the collection of microorganisms.

In a preferred embodiment of the invention, the predetermined dilution of the oxidant is continuously produced immediately before it is synchronously metered into the mixer with the predetermined dilution of the ammonium bromide.

In a preferred embodiment of the invention, the predetermined dilution of the ammonium bromide is continuously produced immediately before it is synchronously metered into the mixer with the predetermined dilution of the oxidant.

In a preferred embodiment of the invention, the bromide activated chloramine, as produced in situ in the mixer, has a pH of at least 8.5 before being introduced into the water communicating with the collection of microorganisms.

In a preferred embodiment of the invention, the bromide activated chloramine, as produced in situ in the mixer, has a pH of over 9.5 before being introduced into the water communicating with the collection of microorganisms.

In a preferred embodiment of the invention, the water communicating with the collection of microorganisms has a pH of between about 5 and about 10.5 before the bromide activated chloramine is injected into the water.

In a preferred embodiment of the invention, the water communicating with the collection of microorganisms has a pH of between about 7 and about 9 before the bromide activated chloramine is injected into the water.

In a preferred embodiment of the invention, the bromide activated chloramine, as produced in site in the conduit, is injected into the water communicating with the collection of microorganisms to a concentration of 0.5-300 ppm expressed as chlorine.

In a preferred embodiment of the invention, the bromide activated chloramine, as produced in situ in the conduit, is injected into the water communicating with the collection of microorganisms to a concentration of 3-10 ppm expressed as chlorine.

In a preferred embodiment of the invention, the ammonium bromide has a concentration of about 0.1 wt.% to about 50 wt.%.

In a preferred embodiment of the invention, the ammonium bromide has a concentration of about 2.5 wt. % to about 38 wt. %.

In a preferred embodiment of the invention, the predetermined dilution of ammonium bromide has a concentration of 0.1 wt. % to 6.0 wt. % and is equimolar to the diluted oxidant solution.

In a preferred embodiment of the invention, the oxidant is selected from the group consisting of sodium hypochlorite and calcium hypochlorite.

In a preferred embodiment of the invention, the oxidant is a solution of hypochlorite, and the ammonium bromide is a solution containing an excess of base corresponding to at least 10% NaOH.

In a preferred embodiment of the invention, a base is synchronously added to the ammonium bromide to stabilize the bromide activated chloramine.

In a preferred embodiment of the invention, the oxidant has a concentration of between 0.1 wt. % and 15 wt. % expressed as $Cl_2$.

In a preferred embodiment of the invention, the oxidant has a concentration between 5 wt. % and 15 wt. % expressed as $Cl_2$.

In a preferred embodiment of the invention, after addition of water the oxidant dilution has a concentration of 0.1 wt. % to 2.0 wt. % expressed as $Cl_2$.

In a preferred embodiment of the invention, said applying an effective amount of bromide activated chloramine includes continuously and synchronously injecting a quantity of hypochlorite into a first stream of water passing through a first conduit to produce therein a predetermined dilution of the hypochlorite, continuously and synchronously injecting a quantity of ammonium bromide into a second stream of water passing through a second conduit to produce therein a predetermined dilution of the ammonium bromide, continuously and synchronously injecting the first and second streams into a mixer according to a predetermined ratio to produce the bromide activated chloramine in situ in the mixer, and continuously injecting the bromide activated chloramine, as it is produced in situ in the mixer, direct from the mixer into water communicating with the collection of microorganisms.

In a preferred embodiment of the invention, the hypochlorite is continuously injected into the first stream of water by a first dosing pump connected to a reservoir of the oxidant.

In a preferred embodiment of the invention, the ammonium bromide is continuously injected into the second stream of water by a second dosing pump connected to a reservoir of the ammonium bromide and synchronously operated with the first dosing pump.

There is also provided, in accordance with a preferred embodiment of the invention, a method of inhibiting the development of a biofilm adjacent a surface, the method comprising intermittently inhibiting the biofilm developing potential of a collection of microorganisms without completely eradicating the collection of microorganisms.

In a preferred embodiment of the invention, said inhibiting the biofilm developing potential of a collection of microorganisms without completely eradicating the collection of microorganisms comprises applying bromide activated chloramine to a collection of microorganisms having biofilm developing potential.

In a preferred embodiment of the invention, each intermittent application of the bromide activated chloramine includes producing a predetermined dilution of a hypochlorite oxidant, producing a predetermined dilution of ammonium bromide, synchronously metering the two dilutions into a mixer to continuously mix therein according to a predetermined ratio to produce the bromide activated chloramine having an effective amount of reproducibility, stability and efficacy in situ in the mixer and continuously injecting the bromide activated chloramine, as it is produced in situ in the mixer, directly from the mixer into water communicating with the collection of microorganisms.

In a preferred embodiment of the invention, the predetermined dilution of the oxidant is continuously produced immediately before it is synchronously metered into the mixer with the predetermined dilution of the ammonium bromide.

In a preferred embodiment of the invention, the predetermined dilution of the ammonium bromide is continuously produced immediately before it is synchronously metered into the mixer with the predetermined dilution of the oxidant.

In a preferred embodiment of the invention, the bromide activated chloramine, as produced in situ in the mixer, has a pH of at least 8.5 before being introduced into the water communicating with the collection of microorganisms.

In a preferred embodiment of the invention, the bromide activated chloramine, as produced in situ in the mixer, has a pH of over 9.5 before being introduced into the water communicating with the collection of microorganisms.

In a preferred embodiment of the invention, the water communicating with the collection of microorganisms has a pH of between about 5 and about 10.5 before the bromide activated chloramine is injected into the water.

In a preferred embodiment of the invention, the water communicating with the collection of microorganisms has a pH of between about 7 and about 9 before the bromide activated chloramine is injected into the water.

In a preferred embodiment of the invention, the bromide activated chloramine, as produced in situ in the mixer, is injected into the water communicating with the collection of microorganisms to a concentration of 0.5-300 ppm expressed as chlorine.

In a preferred embodiment of the invention, the bromide activated chloramine, as produced in situ in the mixer, is injected into the water communicating with the collection of microorganisms to a concentration of 3-10 ppm expressed as chlorine.

In a preferred embodiment of the invention the ammonium bromide has a concentration of bout 0.1 wt. % to about 50 wt. %.

In a preferred embodiment of the invention, the ammonium bromide has a concentration of about 2.5 wt. % to about 38 wt. %.

In a preferred embodiment of the invention, the predetermined dilution of ammonium bromide has a concentration of 0.1 wt. % to 6.0 wt. % and is equimolar to the diluted oxidant solution.

In a preferred embodiment of the invention, the oxidant is selected from the group consisting of sodium hypochlorite and calcium hypochlorite.

In a preferred embodiment of the invention, the oxidant is a solution of hypochlorite, and the ammonium bromide is a solution containing an excess of base corresponding to at least 10% NaOH.

In a preferred embodiment of the invention, a base is synchronously added to the ammonium bromide to stabilize the bromide activated chloramine.

In a preferred embodiment of the invention, the oxidant has a concentration of between 0.1 wt. % and 15 wt. % expressed as $Cl_2$.

In a preferred embodiment of the invention, the oxidant has a concentration between 5 wt. % and 15 wt. % expressed as $Cl_2$.

In a preferred embodiment of the invention, after addition of water the oxidant dilution has a concentration of 0.1 wt. % to 2.0 wt. % expressed as $Cl_2$.

In a preferred embodiment of the invention, applying an effective amount of bromide activated chloramine includes continuously and synchronously injecting a quantity of hypochlorite into a first stream of water passing through a first conduit to produce therein a predetermined dilution of the hypochlorite, continuously and synchronously injecting, a quantity of ammonium bromide into a second stream of water passing through a second conduit to produce therein a predetermined dilution of the ammonium bromide, continuously and synchronously injecting the first and second streams into a mixer according to a predetermined ratio to produce the bromide activated chloramine in situ in the mixer, and continuously injecting the bromide activated chloramine, as it is produced in situ in the mixer, directly from the mixer into water communicating with the collection of microorganisms.

In preferred embodiment or the invention, the hypochlorite is continuously injected into the first stream of water by a first dosing pump connected to a reservoir of the hypochlorite.

In a preferred embodiment of the invention, the ammonium bromide is continuously injected into the second stream of water by a second dosing pump connected to a reservoir of the ammonium bromide and synchronously operated with the first dosing pump.

There is also provided, in accordance with a preferred embodiment of the invention, a growth-controlled biomass comprising a collection of microorganisms and bromide activated chloramine at a concentration effective to inhibit development of a biofilm by the collection of microorganisms.

In one preferred embodiment of the invention, the collection of microorganisms is attached to a durable surface. In another preferred embodiment of the invention, the collection of microorganisms is attached to a consumable surface.

There is also provided, in accordance with a preferred embodiment of the invention, a growth-controlled biomass comprising a collection of microorganisms and bromide activated chloramine at a concentration effective to destroy the biofilm developing potential of the collection of microorganisms without completely eradicating the collection of microorganisms.

In a preferred embodiment of the invention, the collection of microorganisms is attached to a durable surface.

In a preferred embodiment of the invention, the collection of microorganisms is attached to a consumable surface.

There is also provided, in accordance with a preferred embodiment of the invention, a growth-controlled biomass including a collection of microorganisms and a biofilm inhibiting substance present at the collection of microorganisms at a concentration and for a duration effective to inhibit development of a biofilm by the collection of microorganisms. In one preferred embodiment of the invention, the collection of microorganisms is attached to a durable surface. In another preferred embodiment of the invention, the collection of microorganisms is attached to a consumable surface.

There is also provided, in accordance with a preferred embodiment of the invention, a growth-controlled biomass including a collection of microorganisms having biofilm developing potential and a biofilm inhibiting substance present at the collection of microorganisms at a concentration and for a duration effective to destroy the biofilm developing potential of the collection of microorganisms without completely destroying the collection of microorganisms. In one preferred embodiment of the invention, the collection of microorganisms is attached to a durable surface. In another preferred embodiment of the invention, the collection of microorganisms is attached to a consumable surface.

There is also provided, in accordance with a preferred embodiment of the invention, a system for inhibiting the development of a biofilm in an industrial water environment including a real time bromide activated chloramine generator adapted to supply bromide activated chloramine in real time at an interface between water and a surface of a solid in an industrial water environment.

There is also provided, in accordance with a preferred embodiment of the invention, a method for inhibiting the development of a biofilm in an industrial water environment including generating bromide activated chloramine in real time and applying the bromide activated chloramine in real time at an interface between water and a surface of a solid in an industrial water environment.

There is also provided, in accordance with a preferred embodiment of the invention, a method for inhibiting the production of an enzyme by a collection of microorganism attached to a surface, the method comprising intermittently applying to a collection of microorganisms attached to a surface a substance which inhibits the production of an enzyme by the collection of microorganisms.

In a preferred embodiment of the invention, the collection of microorganisms is attached to surface in an industrial water environment.

In one preferred embodiment of the invention, the surface is a durable surface. In another preferred embodiment of the invention, the surface is a consumable surface.

In a preferred embodiment of the invention, the substance does not completely eradicate the collection of microorganisms.

In a preferred embodiment of the invention, the substance does not inactivate the enzyme. In a preferred embodiment of the invention, the enzyme is a hydrogen peroxide-degrading enzyme (HPDE), preferably a catalase, a dehyrogenase or a peroxidase. In another preferred embodiment of the invention, the enzyme is a starch-degrading enzyme, preferably an amylase.

In a preferred embodiment of the invention, the collection of microorganisms is present at an interface between water and a surface of solid in an industrial environment.

In a preferred embodiment of the invention, the substance is bromide activated chloramine.

There is also provided, in accordance with a preferred embodiment of the invention, a method for inhibiting the production of an enzyme by a collection of microorganisms attached to a surface in an industrial water environment, the method comprising intermittently applying to a collection of microorganisms attached to a surface in an industrial water environment a substance which inhibits the production of an enzyme by the collection of microorganisms There is also provided, in accordance with a preferred embodiment of the invention, a method of inhibiting the production of an enzyme by a collection of microorganisms adjacent a surface, the method comprising intermittently applying an enzyme production inhibiting substance to a collection of microorganisms adjacent a surface which have enzyme producing potential.

There is also provided, in accordance with a preferred embodiment of the invention, a method of inhibiting the production of an enzyme by a collection of microorganisms adjacent a surface, the method comprising inhibiting the enzyme producing potential of the collection of microorganisms without complete eradicating the collection of microorganisms.

In a preferred embodiment of the invention, said inhibiting the enzyme producing potential of the collection of microorganisms without completely eradicating the collection of microorganisms comprises intermittently applying an enzyme production inhibiting substance to a collection of microorganisms adjacent a surface which have enzyme producing potential.

There is also provided, in accordance with a preferred embodiment of the invention, a system for reducing the production of an enzyme by a collection or microorganisms attached to a surface, the system comprising an intermittent applicator for intermittently applying an enzyme production inhibiting substance to a collection of microorganisms having enzyme production potential which are attached to a surface.

In a preferred embodiment of the invention, the intermittent applicator includes an administerer which administers the enzyme production inhibiting substance to water communicating with the collection of microorganisms.

In a preferred embodiment of the invention, the administerer administers a first discrete amount of an enzyme production inhibiting substance to water communicating with the collection of microorganisms and after a specified period of time administers a second discrete amount of an enzyme production inhibiting substance to the water communicating with the collection of microorganisms.

In a preferred embodiment of the invention, the administerer administers a first discrete amount of an enzyme production inhibiting substance to water communicating with the collection of microorganisms, whereby to obtain a first concentration of the enzyme production inhibiting substance in the water communicating with the collection of microorganisms; and then, after the concentration of the enzyme production inhibiting substance in the water communicating with the collection of microorganisms falls below the first concentration, administers a second discrete amount of an enzyme production inhibiting substance to water communicating with the collection of microorganisms.

In a preferred embodiment of the invention, the enzyme production inhibiting substance does not completely eradicate the collection of microorganisms.

In a preferred embodiment of the invention, the enzyme production inhibiting substance does not inactivate the enzyme. In one preferred embodiment of the invention, the enzyme is a hydrogen peroxide degrading enzyme, preferably a catalase, a dehydrogenase or a peroxidase. In another preferred embodiment of the invention, the enzyme is a starch degrading enzyme, preferably an amylase.

In a preferred embodiment of the invention, the collection of microorganisms is present at an interface between water and a surface of a solid in an industrial environment.

In a preferred embodiment of the invention, the enzyme production inhibiting substance is bromide activated chloramine.

In one preferred embodiment of the invention, the enzyme production inhibiting substance is presented at the collection of microorganisms periodically with a duty cycle of less than 1:2. In another preferred embodiment of the invention, the enzyme production inhibiting substance is presented at the collection of microorganisms periodically with a duty cycle of between about 1:5 and 1:10. In another preferred embodiment of the invention, the enzyme production inhibiting substance is presented at the collection of microorganisms periodically with a duty cycle of less than 1:10. In another preferred embodiment of the invention, the enzyme production inhibiting substance is presented at the collection of microorganisms periodically with a duty cycle of less than 1:25. In another preferred embodiment of the invention, the enzyme production inhibiting substance is presented at the collection of microorganisms periodically with a duty cycle of less than 1:50.

In a preferred embodiment of the invention, the intermittent applicator intermittently generates the enzyme production inhibiting substance in real time.

In a preferred embodiment of the invention, the intermittent applicator further supplies the enzyme production inhibiting substance to the collection of microorganisms as the enzyme production inhibiting substance is generated in real time.

In a preferred embodiment of the invention, the intermittent applicator includes a first producer for producing a predetermined dilution of hypochlorite, a second producer for producing a predetermined dilution of an ammonium salt, and a controller for continuously and synchronously mixing the two dilutions in a mixer according to a predetermined ratio to produce the enzyme production inhibiting substance in situ in the mixer.

In a preferred embodiment of the invention, the intermittent applicator includes an injector for continuously injecting the enzyme production inhibiting substance, as it is produced in situ in the mixer, directly from the mixer into water communicating with the collection of microorganisms.

In a preferred embodiment of the invention, the ammonium salt is selected from the group consisting of ammonium chloride and ammonium bromide.

There is also provided, in accordance with a preferred embodiment of the invention, a method for inhibiting the production of an enzyme by a collection of microorganisms, the method comprising administering to a collection of microorganisms at an interface between water and a surface of a solid in an industrial water environment an amount of bromide activated chloramine effective to inhibit production of an enzyme by the collection of microorganisms without completely eradicating the collection of microorganisms.

In a preferred embodiment of the invention, the bromide activated chloramine does not inactivate the enzyme.

In one preferred embodiment of the invention, the enzyme is a hydrogen peroxide destroying enzyme, preferably a catalase, a dehydrogenase or a peroxidase. In another preferred embodiment of the invention, the enzyme is a starch degrading enzyme, preferably an amylase.

In a preferred embodiment of the invention, said administering bromide activated chloramine includes producing a predetermined dilution of a hypochlorite oxidant, producing a predetermined dilution of ammonium bromide, synchronously metering the two dilutions into a mixer to continuously mix therein according to a predetermined ratio to produce the bromide activated chloramine having an effective amount of reproducibility, stability and efficacy in situ in the mixer and continuously injecting the bromide activated chloramine, as it is produced in situ in the mixer, directly from the mixer into water communicating with the collection of microorganisms.

In a preferred embodiment of the invention, the predetermined dilution of the oxidant is continuously produced immediately before it is synchronously metered into the mixer with the predetermined dilution of the amine source.

In a preferred embodiment of the invention, the bromide activated chloramine, as produced in situ in the mixer, has a pH of at least 8.5, preferably over 9.5, before being introduced into water communicating with the collection of microorganisms. In a preferred embodiment of the invention, the water communicating with the collection of microorganisms has a pH of 5-10.5, preferably 7-9, before the bromide activated chloramine is injected into it.

There is also provided, in accordance with a preferred embodiment of the invention, an enzyme production-controlled biomass comprising a collection of microorganisms and bromide activated chloramine at a concentration effective to inhibit production of an enzyme by the collection of microorganisms.

In one preferred embodiment of the invention the collection of microorganisms is attached to a durable surface. In another preferred embodiment of the invention, the collection of microorganisms is attached to a consumable surface.

There is also provided, in accordance with a preferred embodiment of the invention, an enzyme production-controlled biomass comprising a collection of microorganisms and bromide activated chloramine at a concentration effective to destroy the enzyme production potential of the collection of microorganisms without completely eradicating the collection of microorganisms.

In one preferred embodiment of the invention, the collection of microorganisms is attached to a durable surface. In another preferred embodiment of the invention, the collection of microorganisms is attached to a consumable surface.

There is also provided, in accordance with a preferred embodiment of the invention, an enzyme production-controlled biomass including a collection of microorganisms attached to a surface and an enzyme production inhibiting substance intermittently present at the collection of microorganisms at a concentration and for a duration effective to inhibit production of an enzyme by the collection of microorganisms.

In one preferred embodiment of the invention, the collection of microorganisms is attached to a durable surface. In another preferred embodiment of the invention, the collection of microorganisms is attached to a consumable surface.

There is also provided, in accordance with a preferred embodiment of the invention, an enzyme production-controlled biomass including a collection of microorganisms having enzyme production potential and an enzyme production inhibiting substance present at the collection of microorganisms at a concentration and for a duration effective to destroy the enzyme production potential of the collection of microorganisms without completely destroying the collection of microorganisms.

In one preferred embodiment of the invention, the collection of microorganisms is attached to a durable surface. In another preferred embodiment of the invention, the collection of microorganisms is attached to a consumable surface.

In one preferred embodiment of the invention, the enzyme is a hydrogen peroxide-degrading enzyme, preferably a catalase, a dehydrogenase or a peroxidase. In another preferred embodiment of the invention, the enzyme is a starch degrading enzyme, preferably an amylase.

There is also provided, in accordance with a preferred embodiment of the invention, a method for inhibiting the development of a biofilm adjacent a surface, the method composing intermittently applying a biofilm inhibiting substance comprising bromide activated chloramine and a peroxide to a collection of microorganisms having biofilm developing potential.

There is also provided, in accordance with a preferred embodiment of the invention, a method for inhibiting the development of a biofilm adjacent a surface, the method comprising inhibiting the biofilm developing potential of a collection of microorganisms without completely eradicating the collection of microorganisms by intermittently applying to the collection of microorganisms a biofilm inhibiting substance comprising bromide activated chloramine and a peroxide.

There is also provided, in accordance with a preferred embodiment of the invention, a method for increasing the persistence of hydrogen peroxide in de-inking or bleaching process water, the method comprising intermittently applying to a collection of microorganisms at an interface between a surface of a solid and the de-inking or bleaching process water a substance that inhibits the production of a hydrogen peroxide-degrading enzyme.

There is also provided, in accordance with a preferred embodiment of the invention, a method for increasing the persistence of hydrogen peroxide in de-inking or bleaching process water, the method comprising inhibiting the hydrogen peroxide degrading enzyme production potential of a collection of microorganisms at an interface between a surface of a solid and the de-inking or bleaching process water by applying to the collection of microorganisms a substance that inhibits the hydrogen peroxide-degrading enzyme production potential of the collection of microorganisms without completely eradicating the collection of microorganisms.

In a preferred embodiment of the invention, the biofilm inhibiting substance includes bromide activated chloramine and the process water contains peroxide.

In a preferred embodiment of the invention, the biofilm inhibiting substance does not degrade peroxide.

There is also provided, in accordance with a preferred embodiment of the invention, a method for controlling a biofilm, comprising applying to a biofilm locus in need of control an amount of a bromide activated chloramine efficacious to disrupt the functioning of the biofilm without eradicating the collection of microorganisms contained in the biofilm.

There is also provided, in accordance with a preferred embodiment of the invention, an aqueous solution comprising a bromide activated chloramine and a peroxide.

In a preferred embodiment of the invention, the concentration of bromide activated chloramine is between about 1 part per million (ppm) and about 10 ppm, expressed as total chlorine.

In a preferred embodiment of the invention, the concentration of peroxide is between about 100 ppm and about 40,000 ppm.

In one preferred embodiment of the invention, the solvent of the aqueous solution is water having a high chlorine demand. In another preferred embodiment of the invention, the solvent of the aqueous solution is water having a low chlorine demand.

There is also provided, in accordance with a preferred embodiment of the invention, a method of inhibiting the development of a biofilm adjacent a surface, the method comprising intermittently applying a biofilm inhibiting substance intentionally at a collection of microorganisms having biofilm developing potential.

There is also provided, in accordance with a preferred embodiment of the invention, a method of inhibiting the development of a biofilm adjacent a surface, the method comprising intentionally inhibiting the biofilm developing potential of a collection of microorganisms without completely eradicating the collection of microorganisms.

In a preferred embodiment of the invention, said intentionally inhibiting the biofilm developing potential of a collection of microorganisms without completely eradicating the collection of microorganisms comprises intermittently applying a biofilm inhibiting substance intentionally to a collection of microorganisms having biofilm developing potential.

There is also provided in accordance with a preferred embodiment of the invention, a system for inhibiting the development of a biofilm adjacent a surface, the system comprising an intermittent applicator for intermittently applying a biofilm inhibiting substance intentionally to a collection of microorganisms having biofilm developing potential.

There is also provided, in accordance with a preferred embodiment of the invention, a method for inhibiting the development of a biofilm comprising intentionally applying to a collection of microorganisms attached to a surface in an industrial water environment at an interface between the surface and water an amount of bromide activated chloramine effective to inhibit the development of a biofilm by the microorganisms without completely eradicating the collection of microorganisms.

There is also provided, in accordance with a preferred embodiment of the invention, a method of inhibiting the development of a biofilm adjacent a surface, the method comprising intermittently applying bromide activated chloramine intentionally to a collection of microorganisms having biofilm developing potential.

There is also provided, in accordance with a preferred embodiment of the invention, a growth-controlled biomass including a collection of microorganisms attached to a surface and a biofilm inhibiting substance intermittently present intentionally at the collection of microorganisms at a concentration and for a duration effective to inhibit development of a biofilm by the collection of microorganisms.

There is also provided, in accordance with a preferred embodiment of the invention, a method for inhibiting the growth of a biofilm in an industrial water environment including generating bromide activated chloramine in real time and applying the bromide activated chloramine in real time at intentionally an interface between water and a surface of a solid in an industrial water environment.

There is also provided, in accordance with a preferred embodiment of the invention, a method for reducing the production of an enzyme by a collection of microorganisms, the method comprising intermittently applying intentionally to a collection of microorganisms attached to a surface a substance which inhibits the production of an enzyme by the collection of microorganisms.

There is also provided, in accordance with a preferred embodiment of the invention, a system for reducing the production of an enzyme by a collection of microorganisms attached to a surface, the system comprising an intermittent applicator for intermittently applying an enzyme production inhibiting substance intentionally to a collection of microorganisms having enzyme production potential which are attached to a surface.

There is also provided, in accordance with a preferred embodiment of the invention, a method for inhibiting the production of an enzyme by a collection of microorganisms, the method comprising intentionally administering to a collection of microorganisms at an interface between water and a surface of a solid in an industrial water environment an amount of bromide activated chloramine effective to effect inhibition of production of an enzyme by the collection of microorganisms without completely eradicating the collection of microorganisms.

There is also provided, in accordance with a preferred embodiment of the invention, a method for inhibiting the development of a biofilm adjacent a surface, the method comprising applying a biofilm inhibiting comprising bromide activated chloramine and a peroxide intentionally to a collection of microorganisms having biofilm developing potential.

There is also provided, in accordance with a preferred embodiment of the invention, a method for inhibiting the development of a biofilm adjacent a surface, the method comprising inhibiting the biofilm developing potential of a collection of microorganisms without completely eradicating the collection of microorganisms by intermittently applying intentionally to the collection of microorganisms a biofilm inhibiting substance comprising bromide activated chloramine and a peroxide.

There is also provided, in accordance with a preferred embodiment of the invention, a method for increasing the persistence of hydrogen peroxide in de-inking or bleaching process water, the method comprising intermittently applying intentionally to a collection of microorganisms at an interface between a surface of a solid and the de-inking or bleaching process water a substance that inhibits the production of a hydrogen peroxide-degrading enzyme.

There is also provided, in accordance with a preferred embodiment of the invention, a method for increasing the persistence of hydrogen peroxide in de-inking or bleaching process water, the method comprising inhibiting the hydrogen peroxide degrading enzyme production potential of a collection of microorganisms at an interface between a surface of a solid and the de-inking or bleaching process water by applying intentionally to the collection of microorganisms a substance that inhibits the hydrogen peroxide-degrading enzyme production potential of the collection of microorganisms without completely eradicating the collection of microorganisms.

There is also provided, in accordance with a preferred embodiment of the invention, a method for controlling a biofilm, comprising intentionally applying to a biofilm locus in need of control an amount of a bromide activated chloramine efficacious to disrupt the functioning of the biofilm without eradicating the collection of microorganisms contained in the biofilm.

There is also provided, in accordance with a preferred embodiment of the invention, a method for inhibiting the development of a biofilm in an industrial water environment including generating bromide activated chloramine in real time and applying the bromide activated chloramine intentionally in real time at an interface between water and a surface of a solid in an industrial water environment to inhibit the development of a biofilm thereat.

DETAILED DESCRIPTION OF PREFERRED EMBODIMENTS

The invention is more particularly described with respect to a number of examples set forth below, and also with respect to the accompanying drawings wherein.

Figure 6:
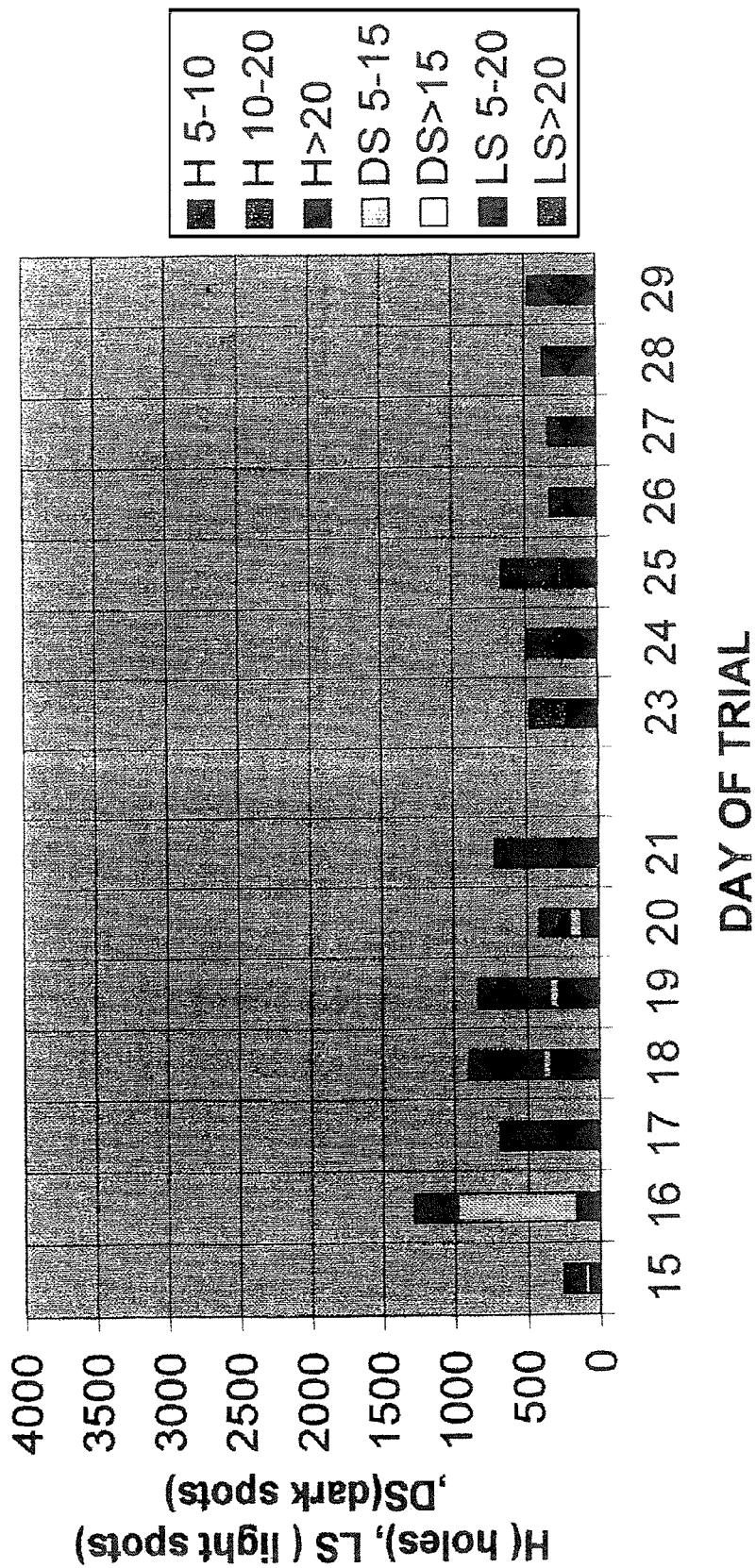
Figure 7:
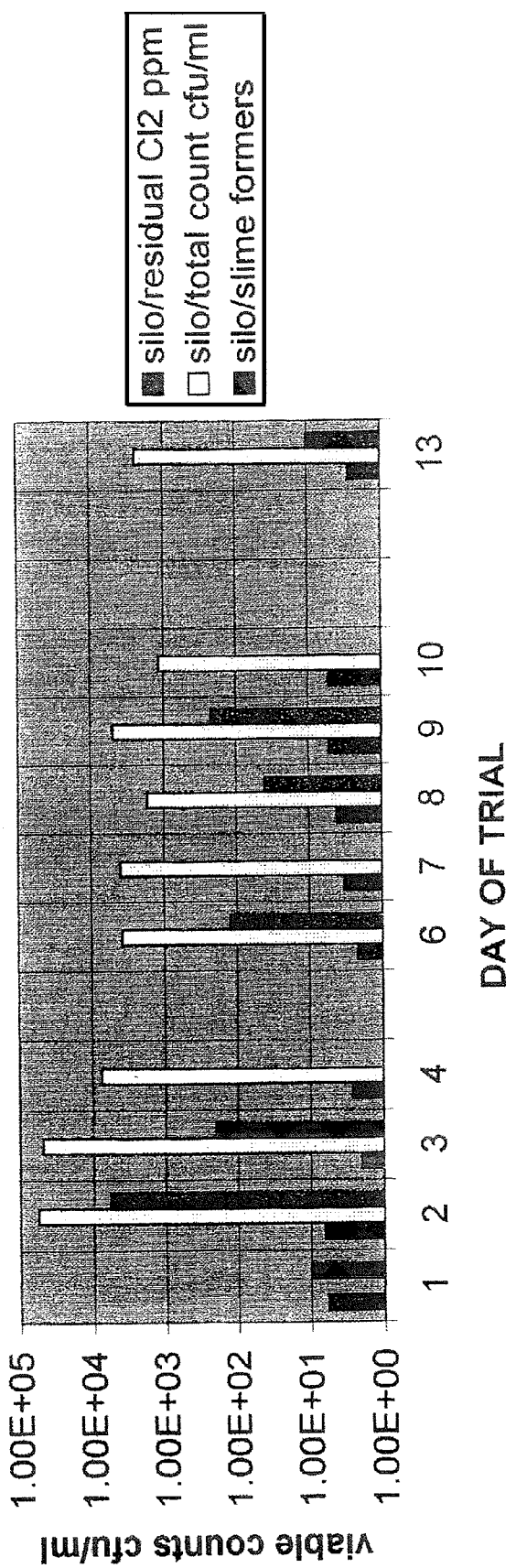
Figure 8:
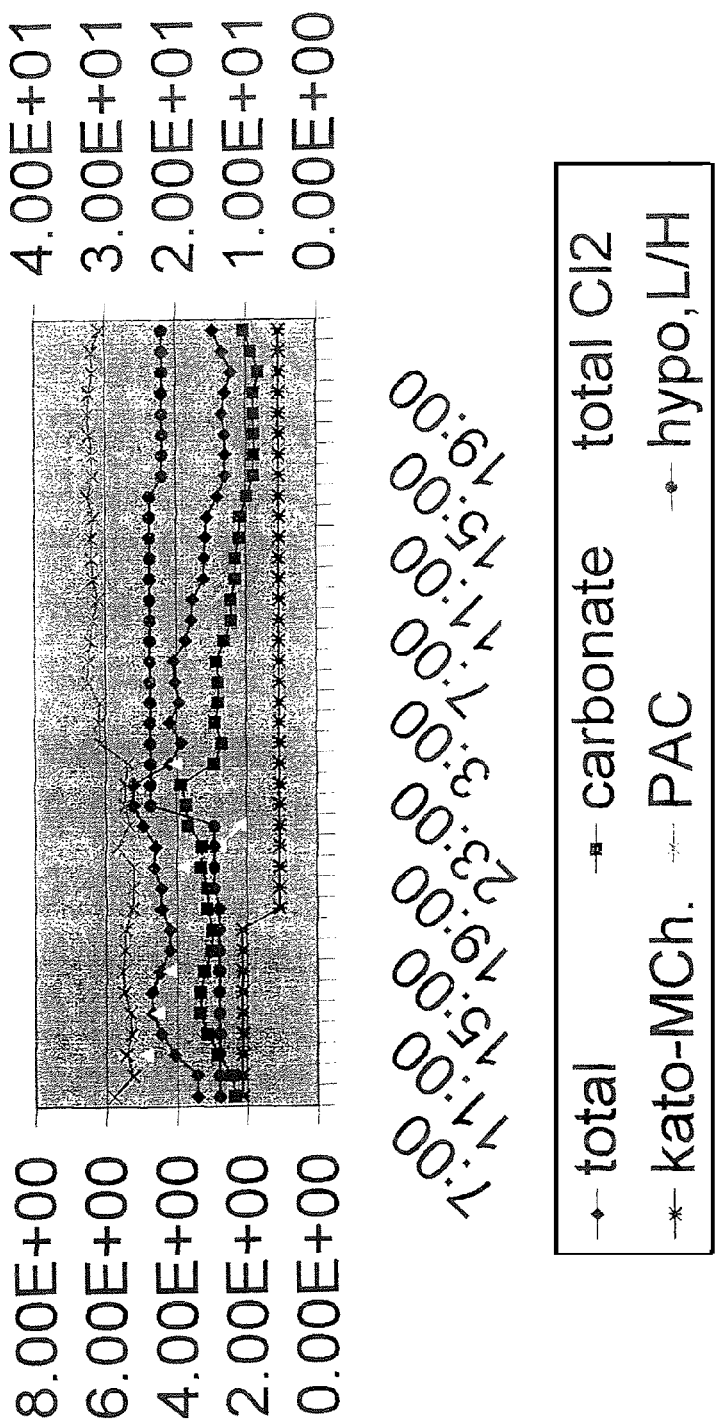

FIG. 6. is a graph showing the incidence of holes and spots in paper following cleaning of the paper making machine and subsequent continuation of intermittent application of a biofilm-inhibiting substance, in accordance with the present invention;

FIG. 7 is a graph showing the counts of different types of viable cells in a paper making machine in response to intermittent application of a biofilms inhibiting substance, in accordance with the present invention; and FIG. 8 is a graph showing the effect of addition of a biofilm inhibiting substance on the retention of fibers in a papermaking machine.

The term "duty cycle" will be understood to mean the ratio between (a) the amount of time the biofilm inhibiting substance or enzyme production inhibiting substance is administered to a collection of microorganisms having biofilm developing potential and (b) the amount of time such a substance is not administered to collection of microorganisms having biofilm developing potential or enzyme developing potential. In a preferred embodiment of the present invention, the biofilm inhibiting substance or the enzyme production inhibiting substance is continuously injected as it is produced into water communicating with a collection of microorganisms having biofilm developing potential. In connection with this preferred embodiment of the invention, the term "duty cycle" will be understood to mean the ratio between (a) the amount of time the biofilm inhibiting substance or enzyme production inhibiting substance is continuously injected as it is produced into water communicating with a collection of microorganisms having biofilm developing potential or enzyme developing potential and (b) the amount of time such a substance is not injected into water communicating with a collection of microorganisms having biofilm developing potential or enzyme developing potential. Thus, if a biofilm inhibiting substance is injected into process water for three hours once in three days in order to inhibit biofilm development, the duty cycle is 1:23.

In the context of this patent application, the term "excess of base corresponding to at least 10% NaOH" means a solution containing the equivalent of more than 2 moles of NaOH per mole of $Cl_2$, calculated based on the formation of NaOCl from $Cl_2$ and NaOH according to the equation:

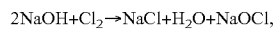

$2NaOH+Cl_2 \rightarrow NaCl+H_2O+NaOCl,$ so that the solution contains excess NaOH, and the total amount of NaOH, calculated as the sum of free NaOH and NaOH as represented by NaOCl, is at least 10%.

In the context the present patent application, the term "wet end chemistry" will be understood to be as defined in the *Handbook of Pulp and Paper Terminology* by G. A. Smook, Cegep de Trois-Rivieres, 1990. Smook defines wet end chemistry as "Physical and surface chemistry of fines and additives and their interaction with fibers."

In the context of the present patent application, it will be understood that the term "a collection of microorganisms attached to a surface" does not imply that each and every microorganism which is part of the collection is itself necessarily directly attached to the surface. For example, a collection of microorganisms which is of several cells' thickness may have a first layer of cells which are attached directly to the surface, and several additional layers of cells stacked upon the lowest layer. Similarly, microorganisms in a biofilm do not necessarily touch the surface to which the biofilm is attached, but are embedded in the matrix of the biofilm. For the purposes of the present patent application, such a collection of microorganism is also considered a collection of microorganisms attached to a surface.

The phrase "development of a biofilm" will be understood to encompass both the creation of a biofilm ab initio by a collection of microorganisms as well as the maintenance or expansion of an existing biofilm by a collection of microorganisms.

In the context of the present patent application, "durable surface" refers to a surface of an industrial process apparatus, such as the surface of a pipe, water chest, or other vessel, which is not consumed during production and which contacts process water. "Consumable surface" refers to a surface, such as the surface of fibers or suspended particles present in the process waters, which during the production cycle may be consumed and exit the apparatus, e.g. as a paper product.

Depending on the type of industrial process, consumable surfaces may be present in the apparatus for significantly less time than durable surfaces, in which case the frequency of treatment or the duty cycle may be determined by the frequency or duty cycle required to treat the durable surfaces.

Conversely, in some processes:
(a) consumable surfaces may be present in the process apparatus for relatively long periods of time, e.g. in cases where some of the process water is recycled back into the process stream,
(b) the consumable surfaces may be coated with wet-end chemicals upon which microorganisms can feed,
(c) the process water may contain a relatively high concentration of consumable surfaces (particles and/or fibers), or
(d) the particles or fibers bearing the consumable surfaces are likely to precipitate.

In such cases the frequency or duty cycle will be determined by the frequency or duty cycle required to treat the consumable surfaces.

Particularly with respect to situations (c) and (d), it is noted that in papermaking, fibers are formed into paper by coating a plastic or wire mesh with a sheet of suspension containing a mixture of fibers, pigments and chemicals, as is well-known in the papermaking art, and then through a series of steps the sheet is dried to a water content of about 8%. "Retention" is defined by Smook at p. 191 as the amount of any papermaking material which is retained in the paper forming process, usually expressed as a percentage of what was initially added. Thus the greater the percentage of fibers which are retained by the mesh, the higher the "retention" of the papermaking process. A retention of 90% is considered excellent; a retention of 50% is considered poor. Those fibers which do not become part of the sheet of paper are recycled for further use.

In papermaking machines having low or poor retention, the concentration of fibers in certain parts of the machinery may be higher than in machines having good retention. Furthermore, because fibers have a large surface area to mass ratio, and because the fibers used in papermaking are porous, further increasing the surface area to mass ratio, the total surface presented by the fibers (which in the context of the present application constitute consumable surfaces) may far exceed the total surface presented by the machinery itself. Moreover, because of recycling of the fibers, the effective time that some of the fibers are present in the papermaking machine may be on the order of hours or even days.

Consequently, without wishing to be bound by a particular theory, the inventor believes that there exists the opportunity for biofilms to form on the surfaces of fibers from which paper is made, and that the presence of such biofilms may have a detrimental effect on paper production, as the ability of fibers to adhere to one another is crucial for the formation of paper of acceptable quality, and the presence of biofilm on the fibers interferes with such adherence. Poor adherence between fibers also increases the likelihood of such fibers precipitating. Furthermore, it is believed that the problem of biofilm formation on fibers may be exacerbated by the use of certain chemicals, such as starch or sugar in the wet end chemistry of the papermaking process, since these chemicals may encourage the growth of biofilms on the fibers.

Figure 1:
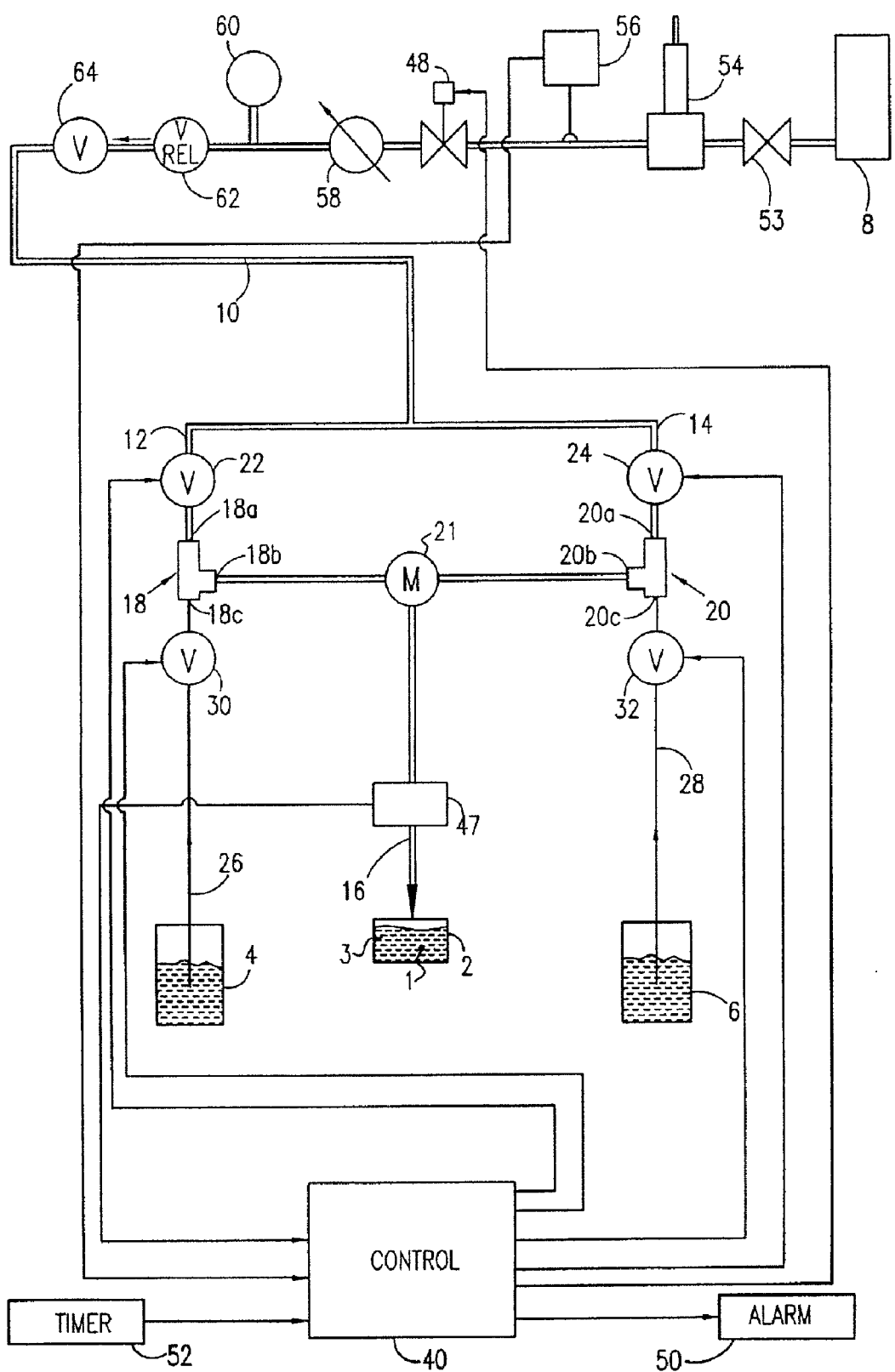
FIG. 1 is a block diagram illustrating one form of apparatus constructed and operative to enable the practice of the present invention.

The apparatus illustrated in FIG. 1 provides a biofilm inhibiting substance to a collection of microorganisms 1 attached to a surface located at a location schematically denoted 2 in the drawing. The location may be, for example, a conduit carrying water or part of a paper making machine, and the surface may be a durable surface or a consumable surface, as defined hereinabove. The biofilm inhibiting substance is applied to the collection of microorganisms 1 by introducing the biofilm inhibiting substance to a liquid 3, such as water, which is in communication with the collection of microorganisms 1. The biofilm inhibiting substance is formed by mixing in situ two solutions, namely an oxidant solution, preferably a hypochlorite solution, within a reservoir 4, and an amine source solution, preferably an ammonium salt solution, within a reservoir 6.

As shown in FIG. 1, water, e.g., tap water is fed from a source 8 via a water pipe 10 through a pair of branch lines 12, 14, connected in parallel to each other, to a mixer 21 which feeds common outlet pipe 16 leading to the liquid 3 at the location 2. Each of the two parallel branch lines 12, 14, includes a venturi tube 18, 20 having an inlet port 18a, 20a, connected in the respective branch line 12, 14, and an outlet port 18b, 20b, connected to mixer 21 which connects to the common outlet line 16 leading to the liquid in communication with the collection of microorganisms. Each of the venturi tubes 18, 20, includes a third port 18c, 20c, leading to the reservoir 4, 6, of the respective solution to be added to the water flowing through the outlet line 16.

The two venturi tubes 18, 20, thus constitute dosing pumps which continuously and synchronously inject both oxidant solution from reservoir 4, and the amine source solution from reservoir 6, into the water from source 8 in proportions which are predetermined for optimal formation of the biofilm inhibiting substance. These two chemicals are mixed in mixer 21 and react with each other in mixer 21 which feeds into outlet pipe 16, so that the reaction product, namely the biofilm inhibiting substance produced by the reaction of these two chemicals, is introduced into the liquid 3 as it is produced in situ.

The two branch lines 12, 14 for the two venturi tubes 18, 20 include control valves 22, 74, which enable the flow rate of the water to be controlled via the two venturi tubes 8, 20. Lines 26, 28 connecting the two reservoirs 4,6 to their respective venturi tubes 18, 20 also include valves, shown at 30, 32, for controlling the dosage of the chemicals into the water passing through the venturi tubes. The latter valves also enable the supply of chemicals to be terminated at the end of the introduction of the biofilm inhibiting substance, so that continued flow of the water via the branch lines 12, 14, mixer 21 and the outlet line 16 will wash away any residue of these chemicals, or their decomposition products, and thereby avoid accumulation of decomposition products which may form at the end of each biofilm inhibiting substance production cycle in the outlet line 16 or in mixer 21.

The control of the foregoing valves is done by a control system, schematically illustrated by block 40. The pH of the biofilm inhibiting substance decreases as the biofilm inhibiting substance decomposes. Outlet line 16, therefore, may also and preferably does include a pH sensor 47 for sensing the pH of the biofilm inhibiting substance, and controlling the control system 40 in response thereto.

Control system 40 also controls the supply of the water from source 8 via an electrical valve 48. Control system 40 can further control an alarm 50 or other signalling device. The illustrated system may further include a timer 52 which is presettable to fix both the lengths of time for which the biofilm inhibiting substance is to be fed via the outlet line 16 to the water communicating with the collection of microorganisms, as well as the time intervals between such feedings of the biofilm inhibiting substance.

The water supply line 10 from the water source 8 to the two branch lines 12, 14, may include additional control devices. For purposes of illustration, the accompanying drawings schematically illustrate the following additional control devices: a manual control valve 53, enabling manual control of the water flow from the source 8; a pressure reducer 54 for reducing the pressure from the source; a pressure sensor 56 which may also be used as an input into the control system 40; a flow meter 58 for indicating the flow rate or flow volume; a pressure gauge 60 for indicating the pressure in line 10; a pressure relief valve 62; and a one-way valve 64.

Preferably, the two venturi tubes 18, 20, and their controls, are designed so as to synchronously feed the same volumes of solutions from the two sources 4, 6 even though the viscosities of the two solutions may be different. The illustrated system operates at a constant predetermined water pressure and at a constant ratio of predetermined dilution of the two solutions to the water passing via the branch lines 12, 14, through the two venturi tubes 18, 20. Each of these parameters can be controlled as described above so that the solutions from the two sources 4, 6, are simultaneously and synchronously injected in the desired predetermined proportions with respect to each other, and also with respect to the water flowing through the venturi tubes 18, 20 from the source 8.

As indicated earlier, the solution in reservoir 4 is an oxidant solution, and the solution within reservoir 6 is an amine source solution. Preferably, the latter is a solution of an ammonium salt, preferably ammonium bromide or ammonium chloride or a mixture thereof, most preferably ammonium bromide. The oxidant solution is preferably a solution of calcium hypochlorite or sodium hypochlorite, most preferably sodium hypochlorite. Preferably, the biofilm inhibiting substance is bromide activated chloramine.

Preferably, the biofilm inhibiting substance has a pH of at least 8.5, preferably at least 9.5, just prior to its injection into liquid 3. Preferably the biofilm inhibiting substance is injected at a rate to maintain in the biofilm inhibiting substance a stable pH of at least 8.5.

Figure 2:
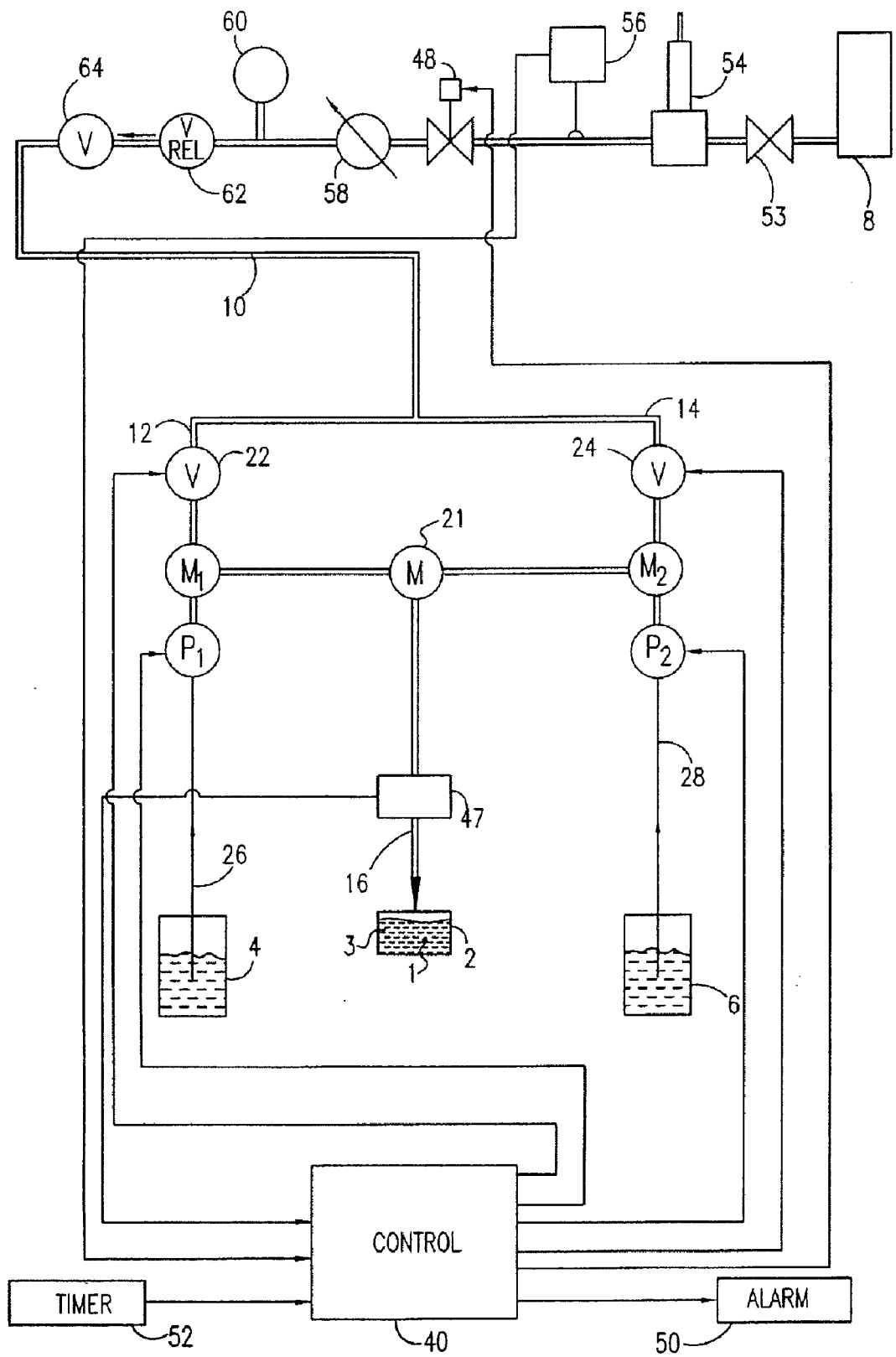
FIG. 2 is a similar block diagram illustrating another apparatus constructed and operative to enable the practice of the present invention.

FIG. 2 illustrates another apparatus, constructed and operative to provide a biofilm inhibiting substance in accordance with a preferred embodiment of the invention. The apparatus shown in FIG. 2 is similar to that in FIG. 1, with like numbers denoting elements of the system of FIG. 2 which are the same as in the system of FIG. 1 and which operate in the same way. The principle difference between the two systems is that in the system of FIG. 2, the venturi tubes 18, 20 are replaced by pulsatile pumps $P_1$, $P_2$. The two pulsatile pumps $P_1$, $P_2$ are also controlled by the control system 40 so as to synchronously meter the liquids from the two reservoirs 4, 6, via feed lines 26, 28, in a manner similar to that of the venturi tubes 18, 20, in the system described above with respect to FIG. 1, except that the liquid pumped out of pumps $P_1$ and $P_2$ is mixed with the water in branch lines 12, 14 at mixers $M_1$, $M_2$ as the water in branch lines 12, 14 flows to mixer 21 and then to outlet line 16. Pulsatile pumps $P_1$ and $P_2$ may be replaced by other types of pumps, such as peristaltic pumps and the like.

The present invention will be better understood through the following illustrative and non-limitative examples of preferred embodiments thereof.

Example 1

Formation of Biofilm in a Model System

Formation of biofilm on stainless steel coupons in the presence or absence of an oxidizing biocide or a biofilm inhibiting substance was evaluated in the laboratory. The test system consisted of (a) three closed flasks each containing 20 L nutrient-rich medium (diluted three-fold from its recommended use concentration), (b) three closed cells containing stainless steel coupons hanging freely, and (c) three identical circulation pumps, each pump connected via plastic pipes to one of the flasks and to one of the cells. The system was placed in a thermostatic room at 35° C.

An innoculum containing a mixed culture of slime-forming bacteria which had been isolated from a paper machine was added to each of the flasks. An oxidizer containing a 5 ppm mixture (expressed as total $Cl_2$) of bromochlorodimethylhydantoin (an oxidizing biocide which is a source of HOBr and HOCl) (hereinafter "mixed halogens") was added to the first flask once a day for the duration of the trial (4 days). A biofilm inhibiting substance, viz. bromide activated chloramine (hereinafter "Fuzzicide BAC"), which can also function as a biocide when applied to planktonic microorganisms, freshly prepared as described in connection with FIG. 1 and in accordance with U.S. Pat. No. 5,976,386 (2.5 ppm expressed as total $Cl_2$) was added to the second flask once a day for the duration of the trial. The third flask served as a control for the two flasks treated with the oxidizing biocide or biofilm inhibiting substances. The "Fuzzicide BAC" biocide was produced in a specific feeding system consisting of two lab pulsatile feeding pumps capable of feeding small volumes (less than 100 µl) per minute with a high pulse frequency. A diluted solution of sodium hypochlorite in deionized (DI) water (~8000 ppm as total chlorine) was fed with one pump; a diluted solution of ammonium bromide (12500 ppm) was fed with the second pump. The two diluted solutions were synchronously mixed in a short glass pipe to form a pre-injection solution of biofilm inhibiting substance, using a pH meter to control and check the stability of the biofilm inhibiting substance formed. The biofilm inhibiting substance was fed to the test system immediately as it was produced. The pre-injection solution of biofilm inhibiting substance contained 3500-4000 ppm as total chlorine; the pH was ~9.5.

On days 2 and 4, each closed cell was opened and 2 coupons were aseptically removed from each cell. At the same time samples of the circulating medium were taken as well. Sampling was conducted after feeding the daily slug dose of biocide.

Each sample of medium was serially 10-fold diluted in sterile saline solution and plated in molten agar. Each coupon was thoroughly rinsed to remove any adhered particles, aseptically scraped, and the material removed by scraping was quantitatively dispersed in saline solution, vortexed, serially 10-fold diluted and plated in molten agar. Viable counts of microorganisms were taken after 48 h of incubation at 35° C. Viable counts of cells in the medium are presented as colony units (cfu) per ml; viable counts on the coupon surfaces are presented as $cfu/cm^2$. The results are tabulated in Table 1.

After two days the viable counts in the media samples (i.e., planktonic microorganisms) were similar in both samples which had been exposed to the oxidizing biocide or the biofilm inhibiting substance, and the viable counts were only slightly higher in the control sample. A significant biofilm was found to be growing on the control coupon after 2 days, a smaller but significant microbial population was growing on the coupons treated with mixed halogens, while the coupons treated with Fuzzicide BAC remained clean. After four days, the medium control sample exhibited a steady count of planktonic microorganisms similar to the count on day 2, the medium sample treated with mixed halogens exhibited some control of planktonic microorganisms (~10-fold reduction in viable count), and the medium sample treated with Fuzzicide BAC exhibited complete control of planktonic microorganisms (within detection limits). With respect to the growth on the coupons, after 4 days the coupons of the control test exhibited a small increase in the viable count of biofilm bacteria compared to the results on day 2, and the coupons treated with mixed halogen exhibited a 3-fold increase in the viable count of biofilm bacteria compared to day 2. The coupons of the system treated with Fuzzicide BAC remained clean.

TABLE 1

| Type of Treatment | Viable Counts After 2 Days | | Viable Counts After 4 Days | |
|---|---|---|---|---|
| | cfu/ml | $cfu/cm^2$ | cfu/ml | $Cfu/cm^2$ |
| Mixed Halogens (5 ppm expressed as $Cl_2$) | $9 \times 10^6$ | 27 | $1 \times 10^6$ | 95 |
| Fuzzicide BAC (2.5 ppm expressed as $Cl_2$) | $1 \times 10^6$ | <27* | <100* | <27* |
| Control | $1.5 \times 10^7$ | 3645 | $1.3 \times 10^7$ | 4050 |

*These values represent the lower detection limit of the equipment used, and therefore are expressed as inequalities - it is possible that the viable counts were actually lower than the numbers recited here.

Example 2

Waste Water Fouling Control

Treated wastewater was piped from a wastewater treatment plant to a location 7 kilometers away. Over the course of years, it was noted that the pipes became clogged and the water flow rate through the pipes decreased. Use of an exceedingly high concentration of $Cl_2$ (feeding up to 50 ppm, i.e. addition of NaOCl at a level of up to 50 mg/l (calculated as $Cl_2$)) was found to be ineffective for improving water conductivity in the pipes. Mechanical cleaning ("pigging") of the pipes resulted in a significant improvement in water conductivity immediately after cleaning, but this improvement lasted only a few days, after which time the pipes attained the level of clogging observed prior to the pigging of the pipes.

Use of the present invention was effective in controlling the biofilm. Prior to beginning a course of treatment using the present invention, the Hazen-Williams coefficient (HW) in the pipe was determined to be ~90. (The Hazen-Williams coefficient is used to express water flow through industrial pipes. It is calculated using the formula $$P = \frac{2340 \times B^{1852} \times s}{C^{1852} \times d^{4870}},$$

wherein P is the friction pressure drop expressed in pounds per square inch per 1000 feet of pipe length, B is the flow rate in barrels per hour, s is the specific gravity of the liquid, C=a friction factor (the Hazen-Williams coefficient), and d is the internal diameter of the pipe in inches. P and B are measured for a given pipe, s and d are treated as constants, and C is calculated. The results are presented as the Hazen-Williams coefficient. The higher the number, the better the flow through the pipe.) Application of 10 ppm of biofilm inhibiting substance, viz. bromide activated chloramine produced in accordance with U.S. Pat. No. 5,976,386 ("Fuzzicide BAC"), expressed as total chlorine, once a day for three hours for 6 consecutive days increased the HW value from ~90 to ~104. A combination of "pigging" and dosing 10 ppm Fuzzicide BAC (expressed as total $Cl_2$) produced in accordance with U.S. Pat. No. 5,976,386 fed once a day for three hours raised the HW value from ~104 to ~116. Once the pipe had been cleaned in this manner, it was found that feeding of 10 ppm (expressed as total chlorine) of Fuzzicide BAC produced in accordance with U.S. Pat. No. 5,976,386 for three hours, once a week, was effective over a period of months to maintain the HW coefficient at a constant value, i.e. it inhibited further formation of biofilm in spite of the high viable counts of microorganisms in the wastewater. The HW coefficient was constant as long as the biofilm inhibiting substance as properly formed and fed to the pipe. A decrease in the HW coefficient was noted when the pipe was not treated properly. This was corrected by increasing the frequency of treatment for a few days.

The biofilm inhibiting substance in this example was produced as follows: a feeding system was constructed, containing a first pulsatile dosing pump which was used to feed up to 300 liters/hour sodium hypochlorite solution (10-15% w/v), and a second pulsatile dosing pump which was used to feed up to 150 liters/hour of ammonium bromide (38% solution w/v). Waste water (up to 10 $m^3/h$) was used to appropriately dilute both chemicals. An on-line pH meter controlled the production process and the hypochlorite feeding rate to ensure the production of a stable biofilm inhibiting substance. The biofilm inhibiting substance was injected into the treated waste pipe as it was produced. Concentration of the biofilm inhibiting substance stock solution was 3000-4000 ppm; the pH was maintained at 9.5-10.

Example 3

Treated wastewater was pumped through several pipes of 10 m length and 4 inches inner diameter in a pilot plant. Biofilm had been growing naturally on the pipe surfaces for several months prior to the commencement of treatment. Pressure drop through each pipe was monitored on-line, and average HW coefficients were calculated. During the trial, control pipes were left untreated, and the remaining pipes were treated with either (a) the biofilm inhibiting substance Fuzzicide BAC, produced on-site in accordance with the invention of U.S. Pat. No. 5,976,386, 10 ppm expressed as total chlorine for three hours three times a week, or (b) a chloramine produced from ammonium chloride which is part of the prior art preceding U.S. Pat. No. 5,976,386 and U.S. Pat. No. 6,132,628, pre-formed as described in the comparative examples of U.S. Pat. No. 6,132,628, applied at 10 ppm (expressed as total chlorine) for three hours, three times a week.

The biofilm inhibiting substance in this example was produced as follows, using a small feeding system was built specifically for this trial. Up to 4 l/h sodium hypochlorite and up to 2 l/h Fuzzicide BAC in up to 56 l/h water were fed into the treated pipes. The concentration of the biofilm inhibiting substance pre-infection solution was ~3600 ppm and the pH was 9.2-9.6. A major portion of this stock solution was discarded and only a small portion was fed due to the high excess of biocide which was formed with this system and the low feed rate. As shown by the results presented in Table 2 and FIG. 3, proper biofilm inhibiting substance formation was critical for the stability and efficacy of the biofilm inhibiting substance—improper preparation led to the formation of a product which was significantly less efficacious than Fuzzicide BAC. The biofilm inhibiting substance derived from ammonium chloride was produced in a dosing system that was copied from the Fuzzicide BAC feeding system.

Figure 3:
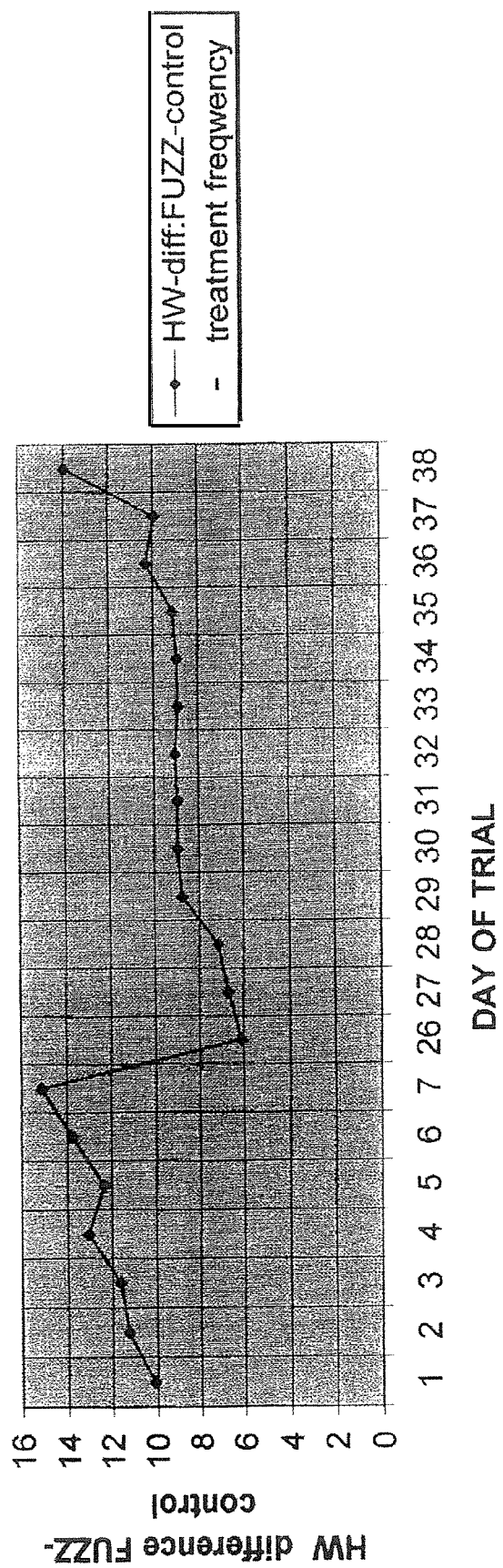
FIG. 3 is a graph of the difference between the Hazen-Williams coefficient in a pipe treated in accordance the present invention and an untreated control pipe.

Table 2 and FIG. 3 show the difference in HW between the control pipes (untreated) and pipes treated with Fuzzicide BAC.

TABLE 2

Difference in HW Value Between Fuzzicide BAC-Treated Pipe and Control Pipe

| Day of Trial | HW Difference, Fuzzicide BAC - Control |
|---|---|
| 1* | 10.12 |
| 2 | 11.25 |
| 3 | 11.62 |
| 4 | 13.04 |
| 5* | 12.35 |
| 6 | 13.76 |
| 7 | 15.13 |
| 26## | 6.11 |
| 27* | 6.67 |
| 28 | 7.13 |
| 29* | 8.75 |
| 30 | 8.93 |
| 31 | 8.93 |
| 32 | 9.02 |
| 33* | 8.89 |
| 34 | 8.93 |
| 35 | 9.12 |
| 36* | 10.31 |
| 37 | 9.96 |
| 38 | 13.97 |

*= day on which water in pipe was treated with Fuzzicide BAC.
= Between days 7 and 26, the biocide was improperly prepared, rendering it ineffective and resulting in a significant lowering of the difference between the HW values in the "treated" and untreated pipes.

As can be seen from Table 2, the effect of Fuzzicide BAC on biofilms is not necessarily apparent on the day of treatment, but is observable for several days afterward (in the form of increased HW value in the treated vs. untreated pipe). The characteristics of the measured HW coefficient show that control of the biofilm cells is not maintained via killing of the embedded cells. This was confirmed by direct enumeration of the biofilm cells.

Figure 4:
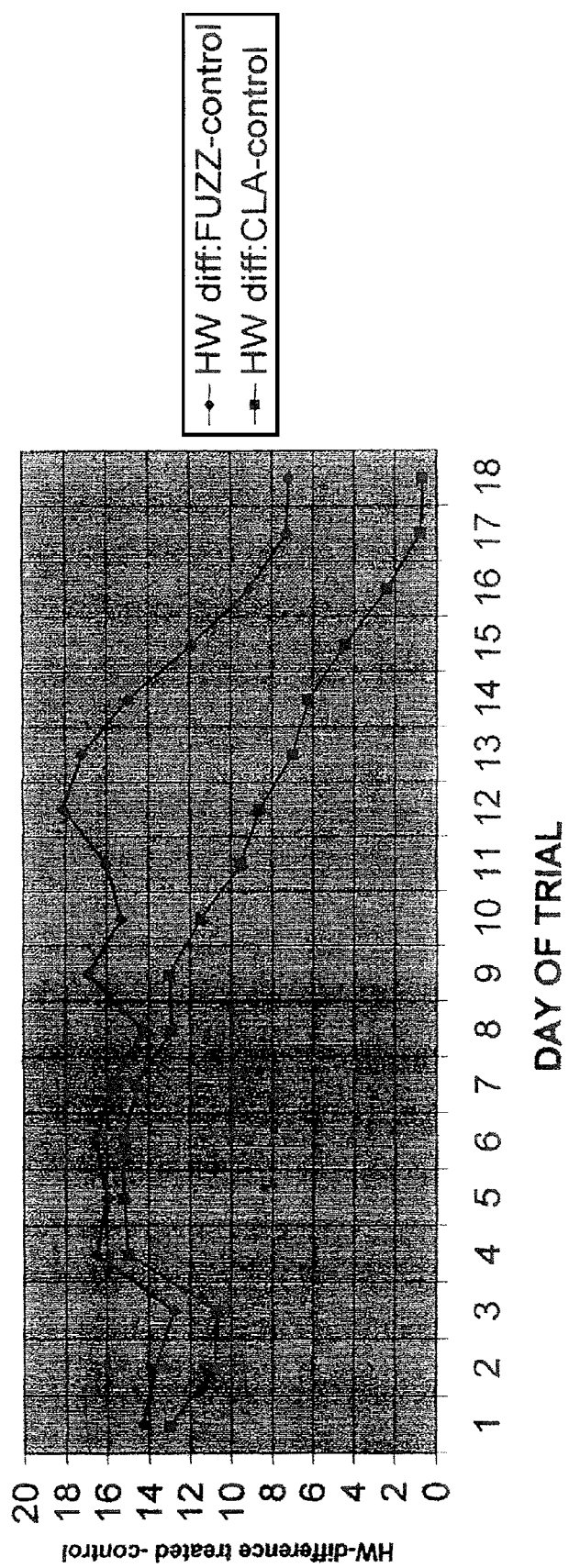
FIG. 4 is a graph comparing differences between pipes treated with a biofilm inhibiting substance, chloramine and an untreated control pipe.

Table 3 shows the results of a comparison of the long-term effects of treatment of biofilm with Fuzzicide BAC vs. treatment with chloramine. On day 1 of this part of the trial, pipes were treated for 3 hours with Fuzzicide BAC or chloramine (each at a concentration of 10 ppm, expressed as total chlorine). The difference in HW value between the biofilm inhibiting substance-fed pipes and the control pipes was monitored on-line for the following 13 days. It was expected that after biofilm inhibiting substance feeding was ceased, biofilm growth would resume in the treated pipes, leading to a decrease in the HW coefficient in these pipes, while the HW coefficient was expected to remain constant in the control (non-treated) pipe. The differences between the HW coefficients of the treated pipes and control pipe were monitored, and the results are presented in Table 3 and FIG. 4.

TABLE 3

| Day of Trial | HW Diff. Fuzzicide BAC - Control | HW Diff. Chloramine - Control |
| --- | --- | --- |
| 1 | 14.3 | 13.0 |
| 2 | 13.7 | 10.8 |
| 3 | 12.8 | 10.7 |
| 4 | 16.5 | 15.0 |
| 5 | 16.0 | 15.2 |
| 6 | 16.55 | 15.15 |
| 7 | 15.8 | 14.6 |
| 8 | 14.3 | 12.9 |
| 9 | 16.9 | 13.0 |
| 10 | 15.3 | 11.5 |
| 11 | 16.0 | 9.5 |
| 12 | 18.1 | 8.6 |
| 13 | 17.2 | 7.0 |
| 14 | 15.0 | 6.2 |
| 15 | 11.9 | 4.4 |
| 16 | 9.1 | 2.4 |
| 17 | 7.3 | 0.8 |
| 18 | 7.2 | 0.7 |

Example 4

Treatment of a Heavily Fouled Paper Machine in Accordance with the Present Invention U.S. Pat. No. 5,789,239 describes a composition and process for the avoidance of slime and/or the removal of biofilm in water-bearing systems. According to the patent, this objective is achieved in that at least one glycol component and at least one enzyme component from the group consisting of carbohydrates, proteases, lipases and glycol proteases are added to the water. The patent presents the results of field trials to demonstrate how the invention disclosed therein can be implemented and the efficacy of the method disclosed therein. One of the parameters used therein to monitor removal of biofilm is paper quality, which is measured on-line during paper production. The results presented in U.S. Pat. No. 5,789,239 show that the statistical distribution of black spots, light spots and holes monitored in the finished product did not differ from previous on-line paper quality results achieved with conventional biocidal treatment.

In the present example, a heavily fouled paper machine was treated with the inventor's Fuzzicide BAC biofilm inhibiting substance, produced on-site using the apparatus described in the inventor's U.S. Pat. No. 5,976,386. The biofilm inhibiting substance was added to the paper machine semi-continuously. The paper machine was not boiled out with caustic prior to commencement of the trial. Rather, the heavy fouling remained present on the machine surfaces at commencement of the trial.

A specifically designed feeding system was built for this trial. A first pulsatile pump fed up to 30 l/h of sodium hypochlorite; a second pulsatile pump fed up to 13 l/h of ammonium bromide. Softened water was used to dilute the chemicals in order to avoid scale formation. The Fuzzicide BAC feeding system was used to dose at three different feeding points along the paper machine. The biofilm inhibiting substance production process was controlled by monitoring the pH of the produced biofilm inhibiting substance and adjusting the mixing of the ingredients as necessary. The biofilm inhibiting substance pre-injection solution contained 3500-4000 ppm expressed as total chlorine, and the product pH was 9.6-9.8. The biofilm inhibiting substance pre-injection solution was reproducible and stable for the duration of this trial and during months of constant use on this paper machine.

Figure 5:
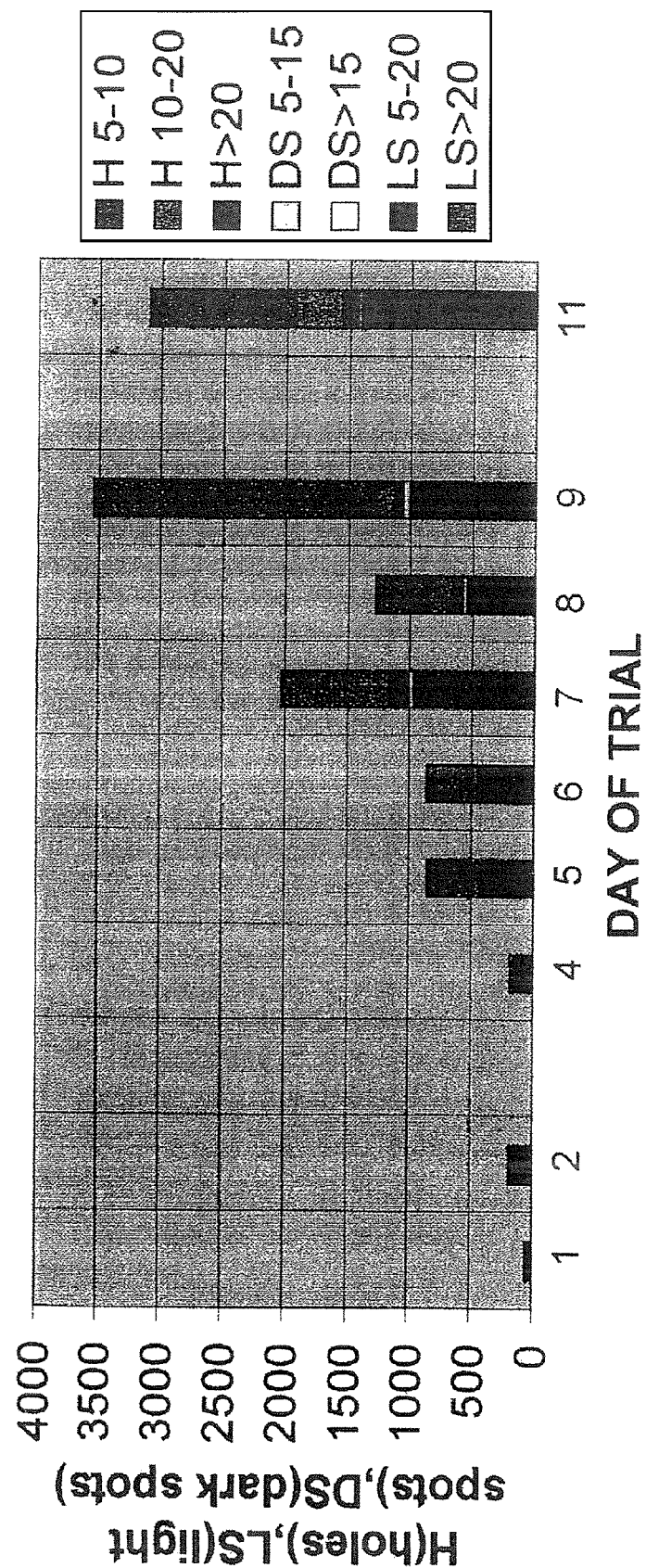
FIG. 5 is a graph showing the incidence in holes and spots in paper following the onset of intermittent application of a biofilm-inhibiting substance to a biofilm growing in a paper making machine, in accordance with the present invention, wherein the machine was not cleaned prior to treatment.

Dark spots, light spots and holes in the finished paper were recorded on-line and are presented in Table 4 and FIG. 5 (the latter of which shows holes and spots in an average roll of paper, which weighs 20 tons). Results are averaged for each type of paper produced (some of which was produced over a period of more than 24 hours).

TABLE 4

| Day of Trial | LS > 20 | LS 5-20 | DS > 15 | DS 5-15 | H > 20 | H 10-20 | H 5-10 |
| --- | --- | --- | --- | --- | --- | --- | --- |
| 1 | 0 | 17 | 0 | 4 | 4 | 10 | 18 |
| 2 | 0 | 74 | 0 | 1 | 3 | 40 | 65 |
| 4* | 1 | 93 | 4 | 23 | 4 | 19 | 36 |
| 5 | 1 | 368 | 1 | 9 | 38 | 143 | 291 |
| 6 | 0 | 390 | 1 | 31 | 15 | 57 | 363 |
| 7 | 1 | 950 | 9 | 48 | 148 | 361 | 509 |
| 8 | 1 | 518 | 15 | 45 | 69 | 208 | 417 |
| 9 | 6 | 979 | 16 | 63 | 56 | 156 | 2266 |
| 11* | 0 | 1392 | 6 | 36 | 117 | 382 | 1152 |

LS = light spots;
DS = dark spots;
H = holes;
sizes given in micrometers.
*Results on day 4 include data from day 3. Results on day 11 include data from day 10.

The steady increase in holes and spots over time from the day of treatment was due to particles of biofilm, of different sizes and colors, which broke off from the machine surface with increasing frequency as a result of the treatment with Fuzzicide BAC.

On the 12$^{th}$ day of the trial, the paper machine was stopped for cleaning. This revealed surfaces covered with a mass of small particles of biofilm which had broken off from the main area of biofilm growth and had dispersed in the water of the machine while the machine surfaces were being cleaned.

Following the cleaning of the paper machine, paper production was resumed, with addition of the biofilm inhibiting substance Fuzzicide BAC to the process water. FIG. 6 shows dark spots, light spots and holes recording during paper production in this period. In comparison to FIG. 5, the total quantity of spots and holes recorded remained relatively small throughout this period, indicating that application of the biofilm inhibiting substance prevented re-formation of biofilm on the surfaces of the paper machine.

Example 5

Inactivation of Catalase

Laboratory tests were conducted in flasks containing 100 ml of deionized (DI) water and using catalase (Merck, enzyme was diluted in saline solution to a final concentration of 26 units per ml) and biofilm inhibiting substance (Fuzzicide BAG or monochloroamine (MCA)). Freshly prepared biofilm inhibiting substance was added to the appropriate flasks containing diluted catalase at a pre-defined feed rate. The contents of the containers were mixed for 60 minutes at room temperature prior to addition of $H_2O_2$ (to a final $H_2O_2$ concentration of 3.5 g/l). After addition of the $H_2O_2$, the mixture was allowed to mix for 30 minutes at room temperature, at which point $H_2O_2$ residues were measured in each flask in accordance with the Dr. Lange Cuvette Test LCW 058, measured with LASA 20 (based on Jander/Blasius. Lehrbach der Analytischen and Praparative Anorganischen Chemie, as described in the Handbook of Photometrical Operation Analysis (October 1997)). The results, which are expressed and presented as total $Cl_2$, are summarized in Table 5. Residues of Fuzzicide BAC and MCA were measure with a Hach pocket colorimeter.

TABLE 5

| Biofilm inhibiting substance (BIS) | BIS Concentration (ppm, as total chlorine) | Catalase, units/ml | Initial $H_2O_2$ concentration, % g/l | Residual $H_2O_2$ concentration, % of 3.5% g/l |
|---|---|---|---|---|
| $NH_4Br + NaOCl$ | 8.1 | 26 | 3.5 | 21.4 |
| $NH_4Br + NaOCl$ | 60 | 26 | 3.5 | 100 |
| $NH_4Br + NaOCl$ | 140 | 26 | 3.5 | 100 |
| $NH_4Cl + NaOCl$ | 6.7 | 26 | 3.5 | 6.8 |
| $NH_4Cl + NaOCl$ | 58 | 26 | 3.5 | 97.1 |
| $NH_4Cl + NaOCl$ | 128 | 26 | 3.5 | 99.4 |
| $NH_4Br + NaOCl$ | 60 | 0 | 3.5 | 100 |
| None | 0 | 26 | 3.5 | ~0 |
| None | 0 | 0 | 3.5 | 100 |

These results show (1) that the enzyme was highly active in degrading $H_2O_2$, (2) that neither chloramine nor Fuzzicide BAC oxidized hydrogen peroxide and (3) that catalase was completely inactivated by chloramine and by Fuzzicide BAC only at a high dosage (~60 ppm or higher as total $Cl_2$) which is much higher than the feed level which, as illustrated in the previous examples, is used to inhibit the biofilm-developing potential of collections of microorganisms and indirectly bring about disintegration of biofilms. At a dosage level of 10 ppm and lower (expressed as total chlorine), the inventor's biofilm inhibiting substances inactivated catalase to an insignificant degree, if at all.

MCA and Fuzzicide BAC were prepared in the lab using procedures similar to those described above for field tests. Sodium hypochlorite was diluted in DI water to a final concentration of 6000 ppm expressed as total chlorine. Ammonium bromide solution (equimolar to 1.1 mole of the diluted sodium hypochlorite solution, 10% excess on a molar basis) and ammonium chloride solution (equimolar to 1.1 mole of the diluted hypochlorite solution, 10% excess on a molar basis) were prepared. The diluted hypochlorite (50 ml) was added dropwise to 50 ml of the appropriate ammonium salt while the pH was constantly measured. The biofilm inhibiting substance concentration in the produced stock solution was immediately measured and the biofilm inhibiting substance at the appropriate feed level was immediately added to the test flasks.

For all practical purposes, MCA and Fuzzicide BAC are ineffective in deactivating peroxide-degrading enzymes when administered at a feed rate level optimized for inhibiting biofilm development at reasonable cost. Thus the mode of action of these biofilm inhibiting substances against the peroxide-degrading enzyme catalase must operate according to a mechanism other than direct inactivation at the enzymes. The present example shows that unlike HOCl and HOBr, which readily react with $H_2O_2$, MCA and Fuzzicide BAC do not oxidize $H_2O_2$. This property enables MCA and Fuzzicide BAC to be used as biofilm inhibiting substances in the presence of high background concentrations of $H_2O_2$ or in mixtures containing $H_2O_2$. Unlike oxidizing biocides which have been used in the art to prevent biofilm growth by killing microorganisms embedded in the biofilm. MCA and in an especially preferred embodiment of the present invention Fuzzicide BAC may be used in the presence of or in combination with other enzymes which may, for various purposes, be added to a process medium, especially an aqueous process medium.

Example 6

Field Trial at a De-Inking Plant

A de-inking system had been using 7-10 kg $H_2O_2$ per ton of waste paper. Previous attempts to control the enzymatic degradation of $H_2O_2$ using conventional biocides like glutaraldehyde did not yield cost-effective results on this system. A parallel de-inking system at the same plant, utilizing a similar de-inking process on waste paper front the same source, was successfully treated with a commercial chemical formulation containing glutaraldehyde: the average $H_2O_2$ consumption rate in this deinking process was reduced to ~4 kg $H_2O_2$/ton of waste paper. Measurements conducted prior to the commencement of the trial with the Fuzzicide BAC technology showed that a high microbial load was present in various parts of the deinking plant, indicating a build-up of heavy slime. Despite the high initial dosage of $H_2O_2$, negligible residues of $H_2O_2$ were found at various points along the system's flow path.

Fuzzicide BAC, produced on-site with a production feed system as described in U.S. Pat. No. 5,976,386, was then fed continuously into the process water for a period of 850 minutes. The biofilm inhibiting substance was produced on-site in a specifically designed dosing system similar to the dosing system described in Example 4. The reaction pH was maintained at 9.8-10.0. The production process was controlled to ensure synchronous metering of the two chemicals, continuous mixing at the predetermined molar ratio and reproducible production of a stable biofilm inhibiting substance stock solution for the duration of the trial and longer. The initial Fuzzicide BAC dosing rate was 170 g/ton expressed as total $Cl_2$. After 850 minutes the dosing rate was reduced to 85 g/ton expressed as total $Cl_2$ by feeding the biofilm inhibiting substance semi-continuously. Various parameters were monitored during start-up of the trial: Residual biofilm inhibiting substance was measured (using a Hach pocket colorimeter, total $Cl_2$, based on the DPD method adapted from Standard Methods for Examination of Waste and Waste Water). Residual hydrogen peroxide was measured using either LASA 20 with the LCW 085 method, based on the method of Jander/Blasius, Lehrbuch der Analytischen and Praparative Anorganischen Chemie, as described in the Handbook of Photometrical Operation Analysis by Dr. Lange for the LASA 20, October 1997 (in cases of high concentration), or Merck Test Strips (0.5-25 ppm). When necessary, samples were diluted with DI water.

The activity of $H_2O_2$-degrading enzymes in the process water was measured according to the following procedure: a commercial solution of $H_2O_2$ was diluted with DI water to a final concentration of 100 g/l water (10%). One ml of the diluted $H_2O_2$ solution was added to 9 ml of a sample taken from the treated de-inking process water to form a final feed rate of 10 g/l $H_2O_2$. The combined sample was incubated at room temperature for 15 minutes, at which time residual $H_2O_2$ was measured. Hydrogen peroxide diluted in DI water served as a control. The residual concentration of $H_2O_2$ was low when the enzymes effectively degraded $H_2O_2$, whereas the residual concentration of $H_2O_2$ was high and close to the $H_2O_2$ feed rate as the $H_2O_2$-degrading enzymes became less effective or as the concentration of enzymes in the process water decreased. The results as % of the $H_2O_2$ remaining the process water after the defined contact time are presented in Table 6. Adenosine triphosphate (ATP) measurements in Table 6 are based on the following process: during the change from ATP to Adenosine monophosphate (AMP) in the presence of luciferin and luciferase, a defined quantity of light is emitted per ATP molecule. This emitted light is measured by a photometer. The results are given in relative terms and are thus relative and snot absolute (RLU=relative light unit). The values can be correlated with microbial activity in the sense that for high viable counts, a high ATP measurement is obtained, and vice versa.

TABLE 6

| Time, min. | Reduction in Catalase Activity, as % of initial $H_2O_2$ concentration | ATP (RLU) | Residual $H_2O_2$, ppm | Residual Fuzzicide BAC, ppm as total chlorine |
|---|---|---|---|---|
| 0 | 37.6 | 132276 | 0 | 0 |
| 100 | 17.8 | 6340 | ~5 | 0.7 |
| 240 | 54.7 | 2861 | ~5 | 1.45 |
| 850 | 92 | 535 | >25 | 1.4 |
| 1500 | 135.1 | 3568 | >250 | 0.7 |

The sharp decrease in ATP following commencement of the trial demonstrates effective control of planktonic microorganisms (free living cells) in the pulper. As expected on the basis of the inventor's earlier aforementioned U.S. patents, the level of ATP continued to decrease throughout the period of continuous dosing, even though the measured residues of Fuzzicide BAC were not exceedingly high. The apparent increase in catalase activity between 0 and 100 minutes is due to degradation of the biofilm and consequent release of material from the biofilm, including microorganisms, catalase and other peroxide-degrading enzymes into the process water.

After 850 minutes, when measurable residues of $H_2O_2$ were detected in samples taken from the pulper, the dosing regime was changed: continuous feed was replaced by semi-continuous feed and the total feed rate was reduced to 50% of its initial value, to 85 g (expressed as total $Cl_2$) per ton of pulp. As expected, the ATP value increased, reflecting an increase in the count of planktonic microorganisms, with a decrease in both feed rate and residue of total $Cl_2$.

In spite of the increase in ATP and in viable counts, $H_2O_2$-degrading enzyme activity decreased as the treatment progressed, and was accompanied by an increase in the concentration of available $H_2O_2$ measured in the process water. After 1500 minutes, $H_2O_2$-degrading enzyme activity appeared to be wiped out, even though the biocide feed rate was decreased at 850 minutes, and ATP concentrations increased between 850 and 1500 minutes.

After about 48 hours of semi-continuous dosing of the biocide, the feed rate of $H_2O_2$ needed in order to maintain bleaching set point was reduced to ~4 kg/ton. After a few more days, it was found that the $H_2O_2$ feed rate could be further reduced to ~2.2 kg/ton and yet the defined de-inking bleaching targets could be maintained at this reduced feed rate.

Example 7

Fuzzicide BAC Efficacy and Viable Counts

During a field trial with Fuzzicide BAC in a paper machine used to produce printing and typing paper, viable counts of microorganisms, principally bacteria, were monitored in the white-water silo (ww) and in the machine chest (Mchest). Process water samples were drawn and immediately inactivated with sodium thiosulfate to degrade any residue of the biofilm inhibiting substance. Samples were then serially ten-fold diluted in a Trypton (DIFCO) saline dilution medium. The diluted samples were plated in molten R2A Agar (hereinafter="total count") and in molten Plate Count agar containing a high excess of glucose (hereinafter "slime formers"). The agar solidified at room temperature and the plates were incubated at 35° C. for 48 h. Viable cells were counted and the results are presented in Table 7 below and in FIG. 7. Two different treatment periods were noted: the biofouling-cleansing period, during which treatment the biofilm inhibiting substance brought about disintegration of the existing biofilm (see also Example 4), and the normal operation period following the cleaning period, when the paper machine operated normally and application of the biofilm inhibiting substance was used to maintain smooth operation of the paper machine (compare to FIG. 6).

Table 7 and FIG. 7 show that during the initial cleaning period, the viable counts in process water samples taken from the silo contained $10^3$-$10^4$ viable cells per ml, irrespective of whether the residue of the Fuzzicide BAC biofilm inhibiting substance was present in high or low concentration. Almost all of the silo samples contained a significant number of colonies, which grew on a high glucose medium. A similar phenomenon was observed in samples taken from the Mchest (results not shown), which exhibited even higher numbers of both total counts and cells which grow in the presence of high glucose content.

TABLE 7

| Day of Trial | Silo/residual $Cl_2$ (ppm) | silo/slime formers (cfu) | silo/total count (cfu) |
|---|---|---|---|
| 1 | 5.85 | $1.0 \times 10^1$ | $1 \times 10^0$ |
| 2 | 6.3 | $5.92 \times 10^3$ | $5.68 \times 10^4$ |
| 3 | 1.98 | $2.0 \times 10^2$ | $4.8 \times 10^4$ |
| 4 | 2.64 | $1.0 \times 10^0$ | $7.6 \times 10^3$ |
| 6 | 2.18 | $1.2 \times 10^2$ | $3.8 \times 10^3$ |
| 7 | 3.2 | $1.0 \times 10^0$ | $4.0 \times 10^3$ |
| 8 | 4 | $4.0 \times 10^1$ | $1.68 \times 10^3$ |
| 9 | 5.05 | $2.2 \times 10^2$ | $5.0 \times 10^3$ |
| 10 | 5.1 | $1.0 \times 10^0$ | $1.18 \times 10^3$ |
| 13 | 2.72 | $1.0 \times 10^1$ | $2.4 \times 10^3$ |

As shown in Table 8, once the paper machine was clean, a significant reduction in total count was found in the water samples.

TABLE 8

| Day of Trial | silo/residual $Cl_2$ (ppm) | silo/slime formers (cfu) | silo/total count (cfu) |
|---|---|---|---|
| 16 | 2.94 | $1.0 \times 10^0$ | $2.0 \times 10^2$ |
| 17 | 3.08 | $1.0 \times 10^0$ | $6.0 \times 10^1$ |
| 20 | 2.56 | $1.0 \times 10^0$ | $3.0 \times 10^2$ |
| 21 | 2.26 | $1.0 \times 10^0$ | $7.5 \times 10^2$ |
| 24 | 2.2 | $1.0 \times 10^0$ | $1.0 \times 10^2$ |
| 27 | 3.62 | $1.0 \times 10^0$ | $1.1 \times 10^2$ |

Taken together, these results indicate that (a) as long as the paper machine was heavily fouled, many if not most of the viable cells, including those embedded in the biofilm, readily grew on a medium having a high glucose content, indicating the presence of enzymes capable of efficiently and quickly degrading glucose, whereas (b) in a clean machine treated with Fuzzicide BAC, the viable cells were unable to grow on a glucose-rich medium, indicating that these cells did not contain enzymes capable of efficiently and quickly degrading glucose at a high concentration, irrespective of whether total counts of viable cells on R2A medium were high or low. These results can be compared with FIGS. 3 and 4, which also show that treatment with biofilm inhibiting substance according to the present invention brings about the disintegration of biofilm in biofouled machines and prevents the re-formation of biofilm in clean machines.

Example 8

Effect of Fuzzicide BAC on Papermaking Efficiency

In a papermaking machine, Fuzzicide BAC was fed intermittently into various parts of the machine. Quick loss of residual Fuzzicide BAC in the machine was observed, the main loss in residual Fuzzicide BAC taking place in the pulpers, specifically in the dry broke pulper. (The dry broke pulper receives paper produced by the machine but which is of unacceptable quality for shipment to customers; this paper is re-used in the paper making machine). It was observed that in the pulpers, the loss in residual biocide was accompanied by a sharp increase in ATP. Initial investigations suggested that the observations were attributable to sub-optimal disinfection in the size press, where starch used to coat the paper is present and provides a good medium to support the growth of microorganisms.

At the same time the loss of residual Fuzzicide BAC and increase in ATP in the pulper was observed, a sharp increase in ATP in the Machine Chest and Head Box, as well as in the clear water, was also observed.

Although the ATP in the pulpers was high, the results in the White Water, which is machine recycled water were still within acceptable parameters.

In order to determine if the loss of residual Fuzzicide BAC was due to problems in the wet end chemistry, the amount of cationic starch being fed to the Machine Chest was reduced by 50%, and 11 hours later the dosage of polyaluminium chloride (PAC), a flocculant to aid in agglomeration of fibers and particles in the headbox, was increased by 20%. Dry broke was still used during this period. The effect on total calcium carbonate retention and precipitated calcium carbonate (PCC) (ash) retention were similar. Changes in feed rate of cationic starch and PAC did not affect the retention significantly.

Five hours after the amount of cationic starch being fed to the Machine Chest was reduced, the dosing rate of Fuzzicide BAC was increased by 65%. A sharp drop in the concentration of suspended material and PCC in the White Water was noted two hours thereafter, followed by a steady improvement in retention during the following 17 hours. The improvement in retention paralleled a steady, slow increase in residual chlorine.

It will be appreciated by persons skilled in the art that the present invention is not limited be what has been particularly shown and described hereinabove. Rather the scope of the present invention includes both combinations and subcombinations of the features described hereinabove as well as modifications and variations thereof which would occur to a person of skill in the art upon reading the foregoing description and which are not the prior art.

The invention claimed is:

1. A method for reducing effects of an enzyme produced by a collection of microorganisms attached to a surface in an industrial water environment, the method comprising:

causing a substance formed by the reaction of a hypochlorite oxidant and an ammonium salt to contact said collection of microorganisms when attached to said surface in said industrial water environment by intermittently feeding said substance into water in said industrial water environment, wherein:

said industrial water environment includes planktonic microorganisms, during each feeding of said intermittently feeding said substance, said substance is fed for a duration and at a concentration sufficient to substantially eliminate the production of said enzyme by said collection of microorganisms until the next feeding of said intermittently feeding said substance, but insufficient to completely eradicate said collection of microorganisms and insufficient to inactivate said enzyme, said substance is introduced into said water in said industrial water environment periodically with a duty cycle of less than 1:10; and viable counts of said planktonic microorganisms increase and activity of said enzyme decreases in said water during said intermittently feeding said substance;

thereby inhibiting the development of a biofilm.

2. A method according to claim 1, wherein said substance is introduced into said water in said industrial water environment periodically with a duty cycle of less than 1:50.

3. A method according to claim 1, wherein the duration between each feeding and said next feeding duration is between about 5 minutes and about 4 hours.

4. A method according to claim 1 and wherein said collection of microorganisms is attached to a durable surface.

5. A method according to claim 1 wherein said duration is about 3 hours.

6. A method according to claim 1 wherein said duration is about 5 minutes.

7. A method according to claim 1 wherein said collection of microorganisms is attached to a consumable surface.

8. A method according to claim 1, wherein said ammonium salt is selected from ammonium bromide and ammonium chloride.

9. A method according to claim 1, wherein said introducing said substance includes generating said substance in real time.

10. A method according to claim 9, wherein said generating said substance in real time includes producing a predetermined dilution of a hypochlorite oxidant, producing a predetermined dilution of an ammonium salt, synchronously metering the two dilutions into a mixer to continuously mix therein according to a predetermined ratio to produce the substance having an effective amount of reproducibility, stability and efficacy in situ in the mixer.

11. A method according to claim 9, wherein said generating said substance in real time includes continuously and synchronously injecting a quantity of hypochlorite into a first stream of water passing through a first conduit to produce therein a predetermined dilution of the hypochlorite, continuously and synchronously injecting a quantity of an ammonium salt into a second stream of water passing through a second conduit to produce therein a predetermined dilution of the ammonium salt and continuously and synchronously injecting the first and second streams into a mixer according to a predetermined ratio to produce said substance in situ in the mixer.

12. A method according to claim 1, wherein said substance includes an effective amount of bromide activated chloramine.

13. A method according claim 1 wherein said substance has a pH of at least 8.5 before being applied to said water.

14. A method according to claim 1 wherein said water has a pH of between about 5 and about 10.5 before said substance is applied to said water.

15. A method according to claim 1, wherein said substance is applied to said water to a concentration of 0.5-300 ppm expressed as chlorine.

16. A method according to claim 1, wherein said substance is applied to said water to a concentration of 3-10 ppm expressed as chlorine.

17. A method according to claim 1, wherein said ammonium salt has a concentration of about 0.1 wt. % to about 50 wt. %.

18. A method according to claim 1, wherein said hypochlorite oxidant is selected from the group consisting of sodium hypochlorite and calcium hypochlorite.

19. A method according to claim 1, wherein a base is synchronously added to said ammonium salt to stabilize the substance.

20. A method according to claim 1, wherein said oxidant has a concentration of between 0.1 wt. % and 15 wt. % expressed as Cl2.

21. A method according to claim 1, wherein said enzyme is a hydrogen peroxide-degrading enzyme (HPDE) or a starch-degrading enzyme.

22. A method according to claim 21, wherein said enzyme is a hydrogen peroxide-degrading enzyme and said collection of microorganisms is present at an interface between a surface and de-inking or bleaching process water, and the persistence of hydrogen peroxide in said de-inking or bleaching process water is increased by application of said substance.

* * * * *